US010719245B1

(12) United States Patent
Gudipati et al.

(10) Patent No.: US 10,719,245 B1
(45) Date of Patent: *Jul. 21, 2020

(54) TRANSACTIONAL IO SCHEDULER FOR STORAGE SYSTEMS WITH MULTIPLE STORAGE DEVICES

(71) Applicant: EMC IP Holding Company LLC, Hopkinton, MA (US)

(72) Inventors: Krishna Chaitanya Gudipati, Fremont, CA (US); Anil Ravindranath, Sunnyvale, CA (US); Rahul Ugale, Santa Clara, CA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/648,935

(22) Filed: Jul. 13, 2017

(51) Int. Cl.
*G06F 3/06* (2006.01)
*G06F 9/48* (2006.01)

(52) U.S. Cl.
CPC ............ *G06F 3/0619* (2013.01); *G06F 3/065* (2013.01); *G06F 3/067* (2013.01); *G06F 3/0689* (2013.01); *G06F 9/4881* (2013.01)

(58) Field of Classification Search
CPC . G06F 3/06; G06F 9/48; G06F 3/0619; G06F 3/0689; G06F 9/4881; G06F 3/065; G06F 3/067
USPC ........................................................ 711/114
See application file for complete search history.

(56) References Cited

U.S. PATENT DOCUMENTS

| | | |
|---|---|---|
| 5,572,670 A | 11/1996 | Puckett |
| 6,263,445 B1 | 7/2001 | Blumenau |
| 6,880,057 B1* | 4/2005 | Webber ............... G06F 13/1673 711/154 |
| 8,881,165 B2 | 11/2014 | Chambliss et al. |
| 8,949,489 B1 | 2/2015 | Merchant |
| 9,081,594 B1 | 7/2015 | Labonte et al. |
| 9,317,382 B2 | 4/2016 | Best et al. |
| 9,524,107 B2 | 12/2016 | Weiner et al. |
| 2003/0204677 A1 | 10/2003 | Bergsten |
| 2004/0194095 A1 | 9/2004 | Lumb et al. |
| 2007/0043854 A1 | 2/2007 | Shum et al. |
| 2007/0174494 A1* | 7/2007 | Bonwick ............... G06F 3/0611 710/5 |
| 2010/0070656 A1 | 3/2010 | Snell et al. |
| 2012/0159474 A1 | 6/2012 | Chakhaiyar et al. |

(Continued)

*Primary Examiner* — David Yi
*Assistant Examiner* — Zubair Ahmed
(74) *Attorney, Agent, or Firm* — Womble Bond Dickinson (US) LLP

(57) ABSTRACT

In one embodiment, a storage system includes a processor, a memory coupled to the processor to store instructions for execution, and an IO tagging module executed by the processor to determine a plurality of child IO requests required to complete a plurality of received IO request transactions and to tag the IO request transaction and/or the associated child IO requests with a tag identifier uniquely identifying the IO request transaction. The system includes an IO scheduler module executed by the processor to prioritize the IO request transactions according to a policy by grouping the child IO requests based on the associated tag identifier. The grouped child IO requests of the IO request transactions are serviced by a plurality of storage devices of the storage system for an optimal performance.

21 Claims, 20 Drawing Sheets

(56) References Cited

U.S. PATENT DOCUMENTS

| | | |
|---|---|---|
| 2013/0067162 A1 | 3/2013 | Jayaraman et al. |
| 2014/0156965 A1 | 6/2014 | Yang et al. |
| 2014/0280970 A1 | 9/2014 | Pijewski et al. |
| 2014/0281121 A1 | 9/2014 | Karamcheti et al. |
| 2014/0304441 A1 | 10/2014 | Balkan et al. |
| 2016/0103764 A1* | 4/2016 | Banerjee ............... G06F 3/061 711/129 |
| 2016/0122203 A1 | 5/2016 | Alshehri |
| 2017/0220500 A1* | 8/2017 | Tong ..................... G06F 3/061 |
| 2018/0196619 A1 | 7/2018 | Ogawa |

\* cited by examiner

| IO | Tag ID | Arrival Time | Internal Child IO | # of Child IO's |
|---|---|---|---|---|
| Backup_App_IO_1 | 0x1 | 1000 | BKUP_IDX_IO_1, BKUP_LP_IO_1, BKUP_META_IO_1, BKUP_L0_IO_1 | 4 |
| Backup_App_IO_2 | 0x2 | 1000 | BKUP_IDX_IO_2, BKUP_LP_IO_2, BKUP_META_IO_2, BKUP_L0_IO_2 | 4 |
| Backup_App_IO_3 | 0x3 | 1002 | BKUP_IDX_IO_3, BKUP_LP_IO_3, BKUP_META_IO_3, BKUP_L0_IO_3 | 4 |
| Backup_App_IO_10 | 0xA | 1003 | BKUP_IDX_IO_A, BKUP_LP_IO_A, BKUP_META_IO_A, BKUP_L0_IO_A | 4 |
| ... | ... | ... | ... | ... |
| GC_IO_2 | ... | 1000 | GC_CLNT-1_IO_2, GC_CLNT-2_IO_2 | 2 |
| GC_IO_3 | ... | 1002 | GC_CLNT-1_IO_3, GC_CLNT-2_IO_3 | 2 |
| ... | ... | ... | ... | ... |
| GC_IO_10 | ... | 1003 | GC_CLNT-1_IO_A, GC_CLNT-2_IO_A | 2 |

FIG. 5

| Application IO Type | Service Priority | Max Latency (milliseconds) |
|---|---|---|
| VM_Instant_Workload | HIGH | 10 |
| Incremental_Backup | MEDIUM | 10 |
| Internal Operations | LOW | 20 |

FIG. 8

| IO | Service Priority | Tag ID | Arrival Time | Internal Child IO | % Transaction Complete | Transaction Dispatch Order |
|---|---|---|---|---|---|---|
| VM_Instant_IO_1 | HIGH | 0x1 | 1000 | vBKUP_IDX_IO_1, vBKUP_LP_IO_1, vBKUP_META_IO_1, vBKUP_LO_IO_1 | 98 | 1 |
| VM_Instant_IO_2 | HIGH | 0x2 | 1000 | vBKUP_IDX_IO_2, vBKUP_LP_IO_2, vBKUP_META_IO_2, vBKUP_LO_IO_2 | 97 | 2 |
| Backup_App_IO_1 | MED | 0x3 | 1000 | BKUP_IDX_IO_3, BKUP_LP_IO_3, BKUP_META_IO_3, BKUP_LO_IO_3 | 98 | 3 |
| Backup_App_IO_2 | MED | 0x4 | 1001 | BKUP_META_IO_1, BKUP_LO_IO_1 | 99 | 4 |
| VM_Instant_IO_3 | HIGH | 0x5 | 1004 | vBKUP_IDX_IO_2, vBKUP_LP_IO_2, vBKUP_META_IO_2, vBKUP_LO_IO_2 | 71 | 6 |
| VM_Instant_IO_4 | HIGH | 0x6 | 1004 | vBKUP_IDX_IO_3, vBKUP_LP_IO_3, vBKUP_META_IO_3, vBKUP_LO_IO_3 | 94 | 5 |
| Backup_App_IO_3 | MED | 0x7 | 1008 | BKUP_IDX_IO_1, BKUP_LP_IO_1, BKUP_META_IO_1, BKUP_LO_IO_1 | 86 | 7 |
| GC_IO_2 | LOW | 0x8 | 1008 | GC_CLNT1_IO_2, GC_CLNT2_IO_2 | 90 | 8 |
| GC_IO_3 | LOW | 0x9 | 1009 | GC_CLNT1_IO_3, GC_CLNT2_IO_3 | 89 | 9 |
| VM_Instant_IO_5 | HIGH | 0xa | 1010 | vBKUP_IDX_IO_3, vBKUP_LP_IO_3, vBKUP_META_IO_3, vBKUP_LO_IO_3 | 78 | 10 |
| Backup_App_IO_4 | MED | 0xb | 1011 | BKUP_IDX_IO_1, BKUP_LP_IO_1, BKUP_META_IO_1, BKUP_LO_IO_1 | 70 | 11 |

FIG. 9

| Application IO Type | Service Priority | Max Latency (milliseconds) | Child IO Quota |
|---|---|---|---|
| VM_Instant_Workload | MED | 10 | 1 |
| Backup App IO | HIGH | 10 | 10 |
| Internal Operations | LOW | 20 | 10 |

Service Priority is Dynamically Updated Based on User Activities

FIG. 11

| IO | Tag ID | Arrival Time | Internal Child IO | % Transaction Complete | Transaction Dispatch Order |
|---|---|---|---|---|---|
| Backup_App_IO_1 | 0x1 | 1000 | BKUP_IDX_IO_1, BKUP_LP_IO_1, BKUP_META_IO_1, BKUP_IO_IO_1 | 70 | 3 |
| Backup_App_IO_2 | 0x2 | 1000 | BKUP_IDX_IO_2, BKUP_LP_IO_2, BKUP_META_IO_2, BKUP_IO_IO_2 | 91 | 2 |
| Backup_App_IO_3 | 0x3 | 1002 | BKUP_IDX_IO_3, BKUP_LP_IO_3, BKUP_META_IO_3, BKUP_IO_IO_3 | 94 | 1 |
| Backup_App_IO_10 | 0xA | 1003 | BKUP_IDX_IO_A, BKUP_LP_IO_A, BKUP_META_IO_A, BKUP_IO_IO_A | 70 | 4 |
| GC_IO_2 | ... | 1000 | GC_CLNT-1_IO_2, GC_CLNT-2_IO_2 | 60 | 6 |
| GC_IO_3 | ... | 1002 | GC_CLNT-1_IO_3, GC_CLNT-2_IO_3 | 80 | 5 |

IOs marked are to storage devices which is not running at optimal performance

FIG. 14

| IO | Tag ID | Arrival Time (nanosec) | Internal Child IO | % Transaction Complete | Transaction Dispatch Order |
|---|---|---|---|---|---|
| VM_Instant_IO_1 | 0x1 | 1000 | BKUP_IO_1, vBKUP_META_IO_1, vBKUP_IO_1 | 98 | 1 |
| VM_Instant_IO_2 | 0x2 | 1000 | BKUP_IO_2, vBKUP_META_IO_2, vBKUP_IO_2 | 97 | 2 |
| Backup_App_IO_1 | 0x3 | 1000 | BKUP_META_IO_1, BKUP_IO_1 | 98 | 3 |
| Backup_App_IO_2 | 0x4 | 1001 | BKUP_META_IO_2, BKUP_IO_2 | 90 | 4 |

FIG. 16

TRANSACTIONAL IO SCHEDULER FOR STORAGE SYSTEMS WITH MULTIPLE STORAGE DEVICES

RELATED APPLICATIONS

This application is related to co-pending U.S. patent application Ser. No. 15/648,954 entitled "Policy Driven IO Scheduler to Improve Read IO performance in Hybrid Storage Systems," filed Jul. 13, 2017, co-pending U.S. patent application Ser. No. 15/648,971, entitled "Policy Driven IO Scheduler to Improve Write IO performance in Hybrid Storage Systems," filed Jul. 13, 2017, co-pending U.S. patent application Ser. No. 15/648,979, entitled "Policy Driven IO Scheduler Resilient to Storage Subsystem Performance," filed Jul. 13, 2017, and co-pending U.S. patent application Ser. No. 15/648,986, entitled "Optimized Read IO for Mix Read/Write Scenario by Chunking Write IOs," filed Jul. 13, 2017. The disclosure of the above applications is incorporated by reference herein in its entirety.

FIELD OF THE INVENTION

Embodiments of the present invention relate generally to data storage systems. More particularly, embodiments of the invention relate to transactional input/output (IO) scheduler for storage systems with multiple storage devices.

BACKGROUND

A data storage file system may initiate multiple child IOs in order to service an IO request transaction for an end-user. For example, a file read/write IO request from a end-user by a backup application may include a child IO request for LP Segment fingerprints, a child IO request for segment index look up, a child IO request to read container metadata, and a child IO request to read a data segment. All child IOs have to be serviced in order to complete the file read/write IO request. The user request IOs may be initiated as part of backup application workload or may be initiated by a maintenance schedule of the user's operating system such as garbage collection.

FIG. 1 is a block diagram illustrating a conventional storage system. Referring to FIG. 1, storage system 104 includes file system 150 and a storage subsystem 160. Optionally storage system 104 may include a RAID subsystem (not shown). The storage system typically consists of many files stored in storage subsystem 160, representing data of one or more client systems (not shown). The storage subsystem 160 includes storage devices (e.g., HDD/SSD disks) 180. Storage devices 180 include physical storage devices (e.g., HDD/SSD disks) 181-187 where the storage devices include corresponding built-in QoS modules such as QoSs 161-167. Storage devices 181-187 would be connected to the same host bus adapter (HBA), such as HBA 171, and would share the HBA bandwidth in communicating with its corresponding QoS module. Once an IO is dispatched from a disk, control is typically lost with respect to which IO and from which disk HBA 171 would prioritize. File system 150 includes QOS throttling 151 and segment store 115. QoS throttling 151 provides a quality of service priority control mechanism that can throttle data traffic with respect to individual storage devices (e.g., storage devices 181-187). Segment store 115 is configured to segment files into a number of segments to be stored in the storage system.

Quality of Service (QoS) is a data packet prioritization technology, allowing a user to treat time sensitive packets with a higher priority than other packets over a network and/or operating systems. Quality of Service (QoS) may throttle or prioritize internal operations such as Garbage Collection. But QoS throttling or prioritizing has its limitations. For example, QoS throttling is limited to a single disk. Furthermore, QoS at a system level also does not take into consideration the underlying storage device types, i.e., Solid State Drives (SSD) versus traditional Hard Disk Drives (HDD) for optimal scheduling.

BRIEF DESCRIPTION OF THE DRAWINGS

Embodiments of the invention are illustrated by way of example and not limitation in the figures of the accompanying drawings in which like references indicate similar elements.

FIG. 5 is an example of a tagging table according to one embodiment.

FIG. 8 is a table illustrating IO types according to one embodiment.

FIG. 9 is a table illustrating IO priority according to one embodiment.

FIG. 11 is a table illustrating IO types according to one embodiment.

FIG. 14 is a table illustrating IO priority according to one embodiment.

FIG. 16 is a table illustrating IO priority according to one embodiment.

DETAILED DESCRIPTION

Figure 1:
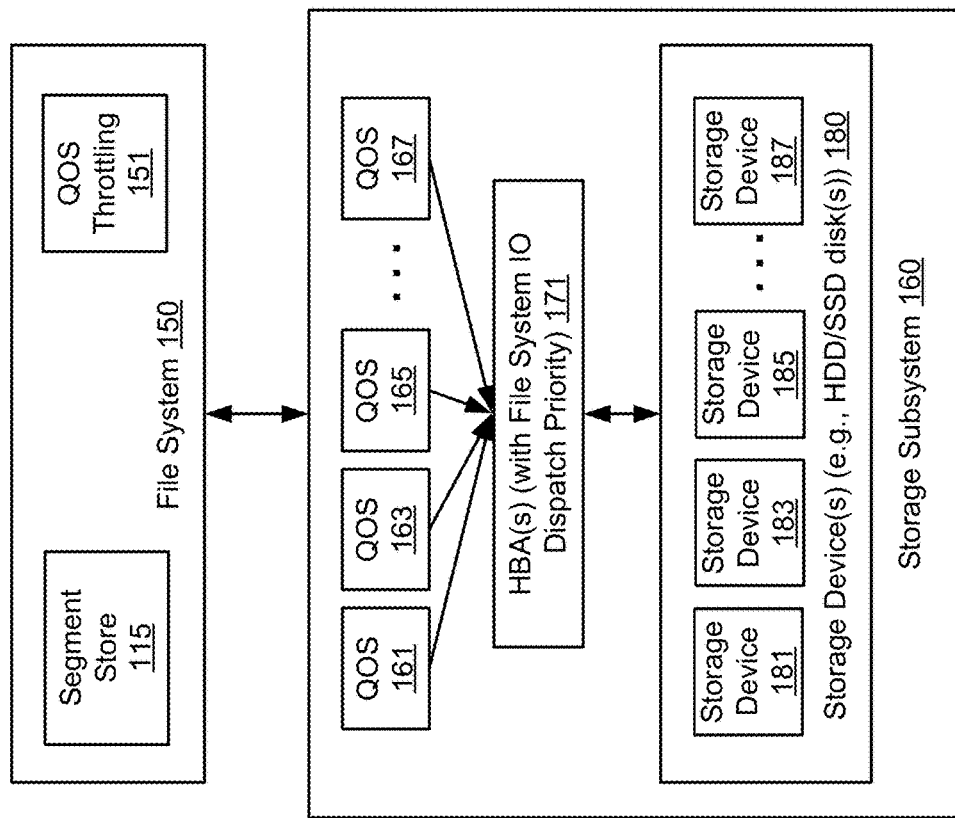
FIG. 1 is a block diagram illustrating a conventional storage system.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, an IO tagging module is utilized within a file system of a storage system to tag all child IO requests that are part of the original application IO as a parent with a unique tag and communicate the allotted tags to other peer modules in the storage system. In addition, a transactional IO scheduler is utilized with the storage subsystem, which has the knowledge of the IO tags and all sibling IO requests of a parent application IO received from the IO tagging module. The transactional IO scheduler dispatches the tagged IO requests to storage devices for storage services, according to a prioritized schedule based on the tags of the IO requests and/or the dispatch policy.

According to one aspect, a system and method prioritizes IO transactions by tagging child IOs to identify the IO request transactions in the IO stack of a storage system. The storage system has multiple storage devices servicing IO requests. An IO tagging module of the storage system can determine a number of child IO requests required to complete each of the IO request transactions within the same session. The IO tagging module tags the IO request transaction and/or the associated child IO requests with a tag identifier uniquely identifying the IO request transaction. An IO scheduler module of the storage system can prioritize the IO request transactions by grouping the child IO requests based on the associated tag identifier.

According to another aspect, a system receives a number of input/output (IO) request transactions at the storage system having multiple storage devices. For each of the IO request transactions, the system determines a number of child IO requests required to complete the IO request transaction and tags the IO request transaction and/or the associated child IO requests with a tag identifier uniquely identifying the IO request transaction within the same session. The system prioritizes the IO request transactions based on a service priority level associated with each of the IO request transaction. The system dispatches the prioritized child IO requests of the IO request transaction to storage devices, including grouping the associated child IO request to be dispatched together.

According to another aspect, a system receives a number of input/output (IO) request transactions at the storage system having multiple storage devices, the IO request transactions including at least a read and a write request transactions. For each of the IO request transactions, the system determines a number of child IO requests required to complete the IO request transaction, where the child IO requests includes a write child IO request and a read child IO request. The system tags the IO request transaction and/or the associated child IO requests with a tag identifier uniquely identifying the IO request transaction within the same session. The system prioritizes the IO request transactions based on a service priority level and completeness of each of the IO request transactions dynamically determined at a point in time and services the child IO requests of the IO request transactions according to a prioritized order to reduce a time of completing the IO request transaction.

According to another aspect, a system receives a number of input/output (IO) request transactions at the storage system having multiple storage devices. The system detects storage events associated with the storage devices, the storage events include storage device error events, storage device path error events, and solid state storage device high write amplification events. For each of the IO request transactions, the system tags the IO request transaction and/or a number of associated child IO requests with a tag identifier and predicts a completion time for the IO request transaction based on a completeness of the IO request transaction and detected events associated with the storage devices. The system sends the child IO requests to the storage devices to be serviced in a first order based on the predicted completion time and an arrival time of the IO request transaction so that the IO request transactions are resilient to storage events.

According to a further aspect, a system receives a number of input/output (IO) request transactions at the storage system having multiple storage devices. For each of the plurality of IO request transactions, the system determines a number of child IO requests required to complete the IO request transaction. The system tags the IO request transaction and/or the associated child IO requests with a tag identifier. For each of the child requests that is a write IO request, the system determines an optimal write IO request size, segments the write IO request into a number of sub-IO write requests, each having an optimal request size, and interleaves sub-IO write requests with read IO requests for servicing to avoid impact in performance to read IO requests for a mixed IO workload.

Figure 2:
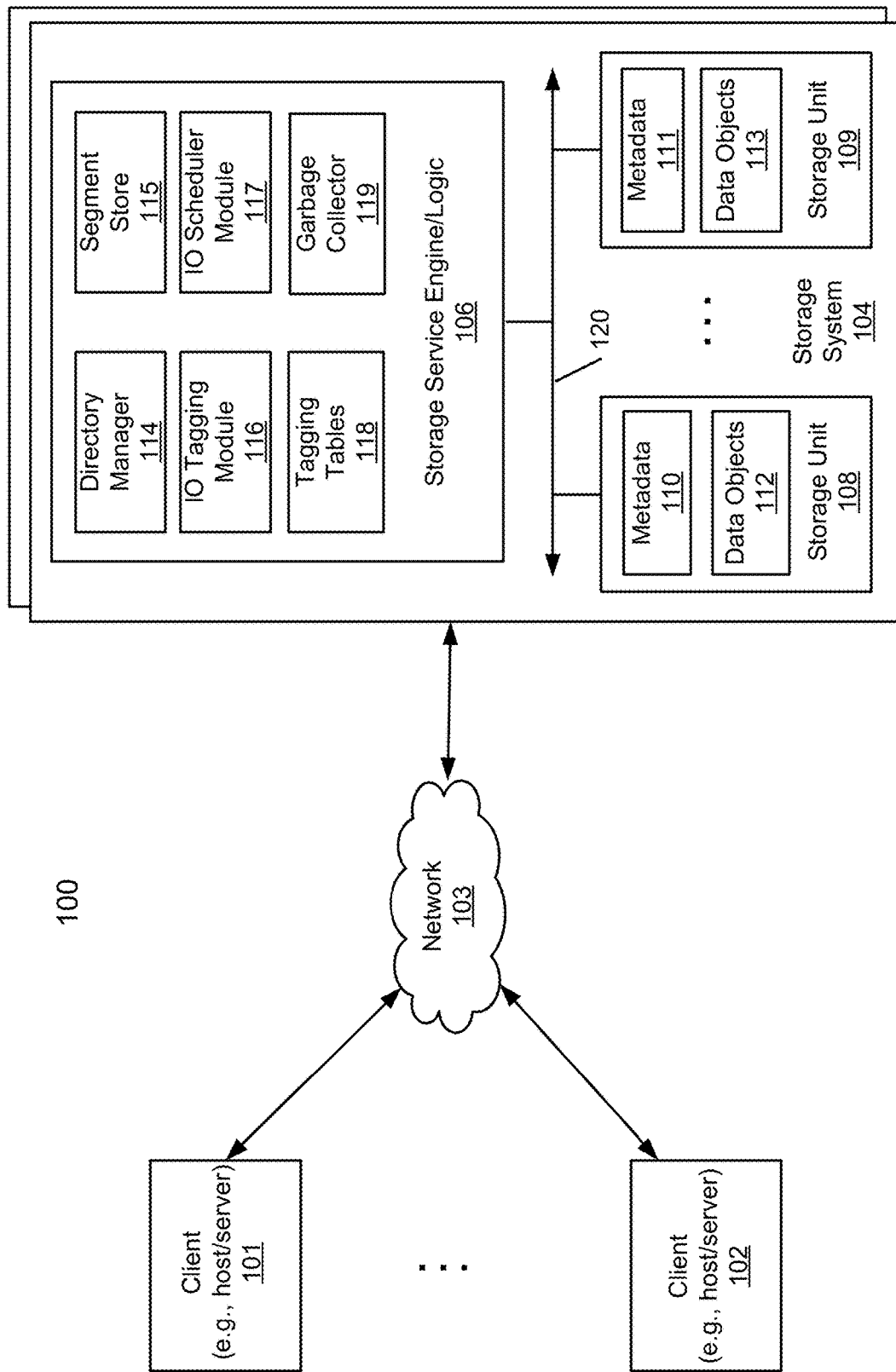
FIG. 2 is a block diagram illustrating a storage system according to one embodiment.

FIG. 2 is a block diagram illustrating a storage system according to one embodiment of the invention. Referring to FIG. 2, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic (not shown), and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include directory manager 114, segment store 115, IO tagging module 116, IO scheduler module 117, tagging tables 118, and garbage collector 119. Directory manager 114 is configured to manage files in the storage system. Directory manager 114 contains a hierarchical mapping from a directory path to an inode representing a file. Segment store 115 is configured to segment files into a number of segments and is configured to manage these file segments. IO tagging module 116 is configured to determine child IO requests required to complete an IO request transaction. Additionally, IO tagging module 116 is configured to tag the child IO requests with a tag identifier unique to the IO request transaction. IO scheduler module 117 is configured to prioritize IO request transactions by grouping child IOs based on their tag identifiers. Tagging tables 118 is configured to store information related to IO transactions, e.g., application IO types, service priority of the IO types, latency, a number of associated child IOs required to complete the IO transactions, the number of completed child IOs, arrival time of the IO transactions, and the associated tag identifiers. Garbage collector 119 is configured to traverse data segments of a storage system to free up system resources and defragment files of the storage system.

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Typically two components manage files of a storage system. The first component can be a directory manager, which manages a hierarchical mapping from the path to the inode representing a file. The second component can be a content/segment store (content store and segment store could be separate modules), which manages the content of the file and segments of the file. Each file has a content handle (CH) that is stored in the inode that is created by content store every time the file content changes. Each CH represents a file that is abstracted as a file tree (e.g., a Merkle tree or Mtree) of segments. In this example, a file tree can have up to 7 levels: L0, . . . , L6. The L0 segments represent user data (e.g., actual data) and are the leaves of the tree. The L6 is the root of the segment tree. Segments from L to L6 are referred to as metadata segments or LP segments.

Figure 3:
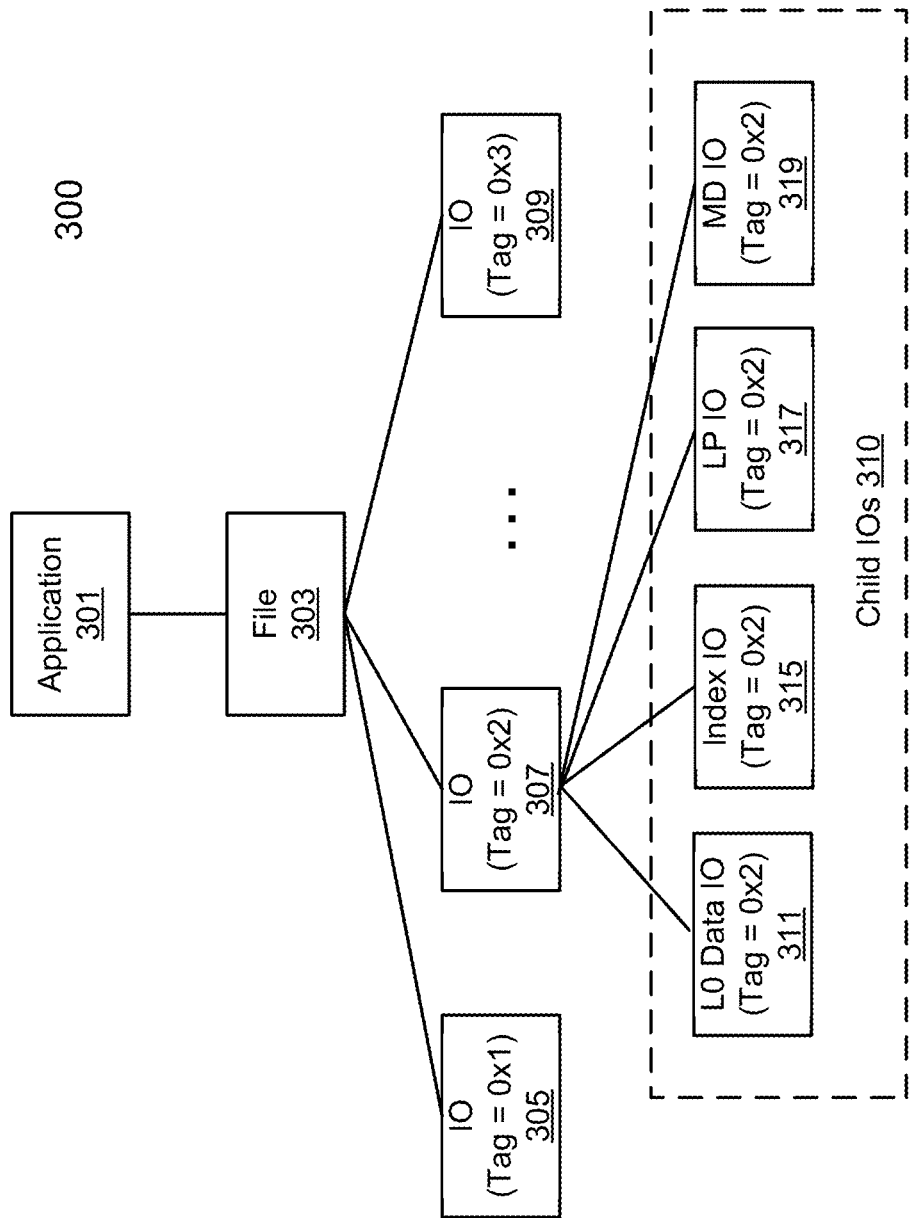
FIG. 3 is a block diagram illustrating an example of application IOs and its child IOs according to one embodiment.

FIG. 3 is a block diagram illustrating an example of an application accessing a file according to one embodiment. In this example an end-user initiates IO request transactions via backup applications to access files. The end-user may perform a file read/write operation, such as a read/write operation for file 303, from an application, such as application 301. Because storage system has many storage devices, file 303 may include multiple file segments stored on separate storage devices of the storage system. The file access request would identify the file content handle and traverse a file tree of the file handle to identify file segments and its locations to subsequently access storage devices containing the file segments thereby completing the file read/write operation. For example, a system may identify IOs 305-309 are required to complete a file access operation for file 303. Each of IOs 305-309 can include many child IOs. E.g., IO 307 includes child IOs 310. Child IOs 310 can include L0 data IO 311, Index IO 315, LP IO 317, and MD IO 319. Note, although only four child IOs are shown, IOs 305-309 can have any number of child IOs. The child IOs can have different completion times and can perform specific operations directed to writing or retrieval of data segments stored on a storage system. For example, Index IO 317 can include the IO operation of looking up, on a first storage device, a fingerprint/container pair for a fingerprint (e.g., metadata) to determine a container unit where the file segment (e.g., L0 data) can be found. L0 data IO 311 can include IO operation for retrieving an L0 data segment from a second storage device different from the first storage device. In one embodiment, IOs 305-309 and/or their child IOs can be tagged with tag identifiers for later identification. Here, IO 305 has tag 0x1. IO 307 has tag 0x2, and IO 309 has tag 0x3. Child IOs of IOs 305-309 are tagged correspondingly, e.g., child IOs 311-319 are tagged with 0x2. Although four child IOs are described, the tagging mechanism can account for any number of child IOs and/or multiple levels of offspring IOs.

Figure 4A:
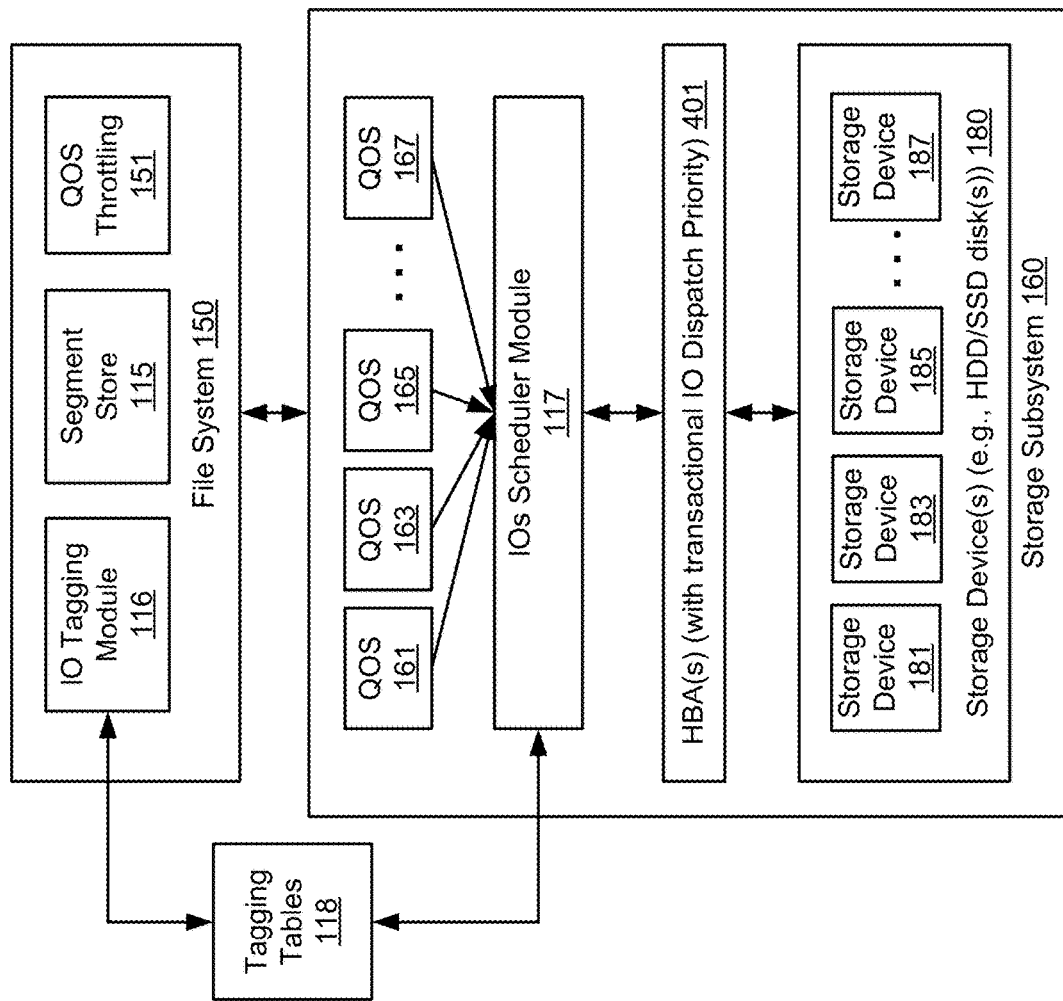
FIG. 4A is a block diagram illustrating a storage system with transactional IOs priority according to one embodiment.
Figure 4B:
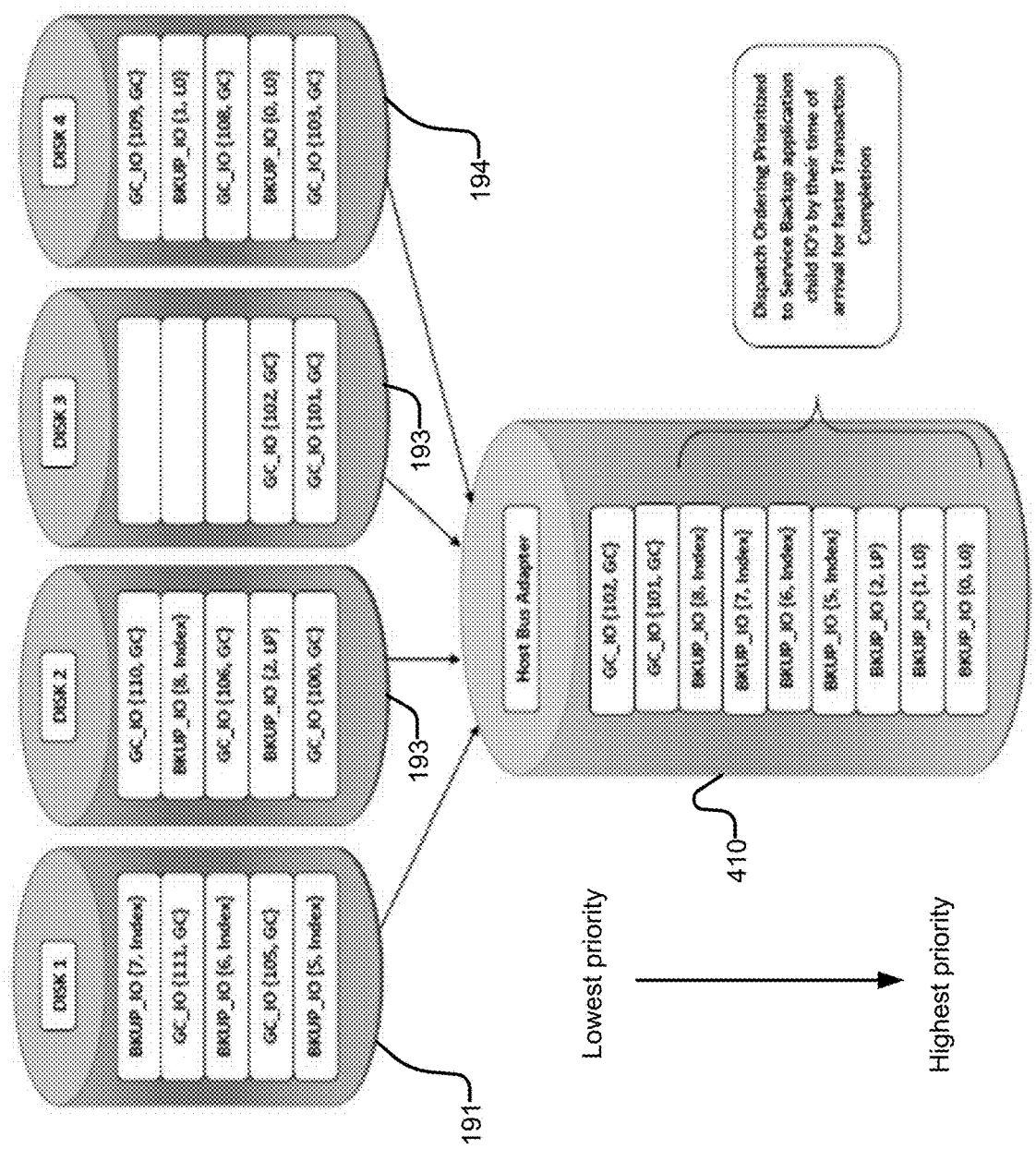
FIG. 4B is a block diagram illustrating QoS of storage devices corresponding to a storage system of FIG. 4A.

FIG. 4A is a block diagram illustrating a storage system with transactional IOs prioritized according to one embodiment. FIG. 4B is a block diagram illustrating QoS of storage devices and an HBA corresponding to a storage system of FIG. 4A. Referring to FIGS. 4A and 4B, storage system 400 includes, in addition to the modules of storage system 104 of FIG. 1A, IO tagging module 116, tagging tables 118, IOs scheduler module 117, and HBAs with transactional IO dispatch priority 401. Note that some of these modules may be integrated as one or more integrated modules, in software, hardware, or both. Tagging module 116, tagging tables 118, IOs scheduler module 117, and HBAs with transactional IO dispatch priority 401 can refine QoS priorities by tagging IO transactions and their corresponding child IOs with a tag identifier so IOs scheduler module 117 can group together the IOs by tag values and can prioritize these IOs prior to dispatching them to the HBA for optimal performances. For example, when file system receives an IO request, a QOS throttling mechanism, such as QOS throttling 151, may have prioritized some of their corresponding child IOs with respect to individual storage devices. I.e., QOS 161 can contain prioritized IOs with respect to storage device 181, independent of storage devices 183-187. QoSs 161-167 can correspond to disk IOs 191-194 of FIG. 4B (for disks 1-4).

To be able to prioritize IOs down to the IO stack, IO tagging module 116 can tag pending child IOs with tag identifiers and stores these information in a tagging table, e.g., as part of tagging tables 118, so that a scheduler module at the IO stack can access the table for information about the child IOs. For example, child IOs associated with QOS 161-165 are received by IOs scheduler module 117 (i.e., scheduler module 117 can access all the IOs tags based on their QOS policies 161-165) before they are dispatched to HBA 401. Scheduler module 117 can query a tagging table, as part of tagging tables 118, based on a tag identifier of the child IO for a corresponding IO request transaction. Scheduler module 117 can then prioritize the tagged child IOs (e.g., IOs of QOSs 161-165) according to a dispatch policy. The IO tag identifier thus can effectively be propagated through an IO stack all the way to the physical storage devices. With information about the IOs, a scheduler module can optimize these IOs according to a priority policy. Here, BKUP_IO {0, L0} and BKUP_IO {1, L0} can be prioritized in the highest priority for optimal performance. In one embodiment, IO scheduler module 117 can dispatch IOs based on at least an arrival time of the 10 request transaction, i.e., IO request transaction with earlier arrival times are dispatched first such that the earlier IO request transactions have a higher priority.

FIG. 5 is an example of a tagging table according to one embodiment. Tagging table 500 may be a part of tagging tables 118 of FIG. 4A. Referring to FIG. 5, table 500 includes a number of entries, each entry having five columns 501-505. The columns are IO transaction ID 501, tag ID 502, arrival time 503, internal child IO 504, and number of child IOs 505. IO transaction 501 is a list of pending IO request transactions identified by their respective transaction IDs. The IO transactions may include IOs initiated by end-users of the storage system, via a remote backup application, and internal operations such as garbage collection IOs scheduled by operating systems of the remote end-users (i.e., virtual machines). Tag ID 502 is a list of tag identifiers with respect to pending IO request transactions which may be assigned by IO tagging module 116. Arrival time 503 is a timestamp that describes an arrival time of the IO request transaction, for example, in nanoseconds. For example, Backup_App_IO_2 arrived two nanoseconds earlier than Backup_App_IO_3. Internal child IOs 504 lists child IOs of corresponding IO transactions of IOs column 501. Column 505 lists a count of the number of corresponding child IOs associated with an IO request transaction 501. For example, looking at the first row, Backup_App_IO_1 has four child IOs: BKUP_IDX_IO_1, BKUP_LP_IO_1, BKUP_META_IO_1, and BKUP_L0_IO_1. These child IOs would be tagged with 0x1 tag identifiers by a tagging module such as tagging module 116 of FIG. 4A. To complete the IO request transaction Backup_App_IO_1 will require completion of the four child IOs.

In one embodiment, each entry of table 500 further includes a column for a counting mechanism (e.g., counters) (not shown) to dynamically track how many child IOs of the total child IOs are completed. When a child IO is completed, a counter of the counter mechanism decrements. The counter can tally a completeness of the IO transaction such that the completeness of the IO transaction can be used by a dispatch policy.

Figure 6:
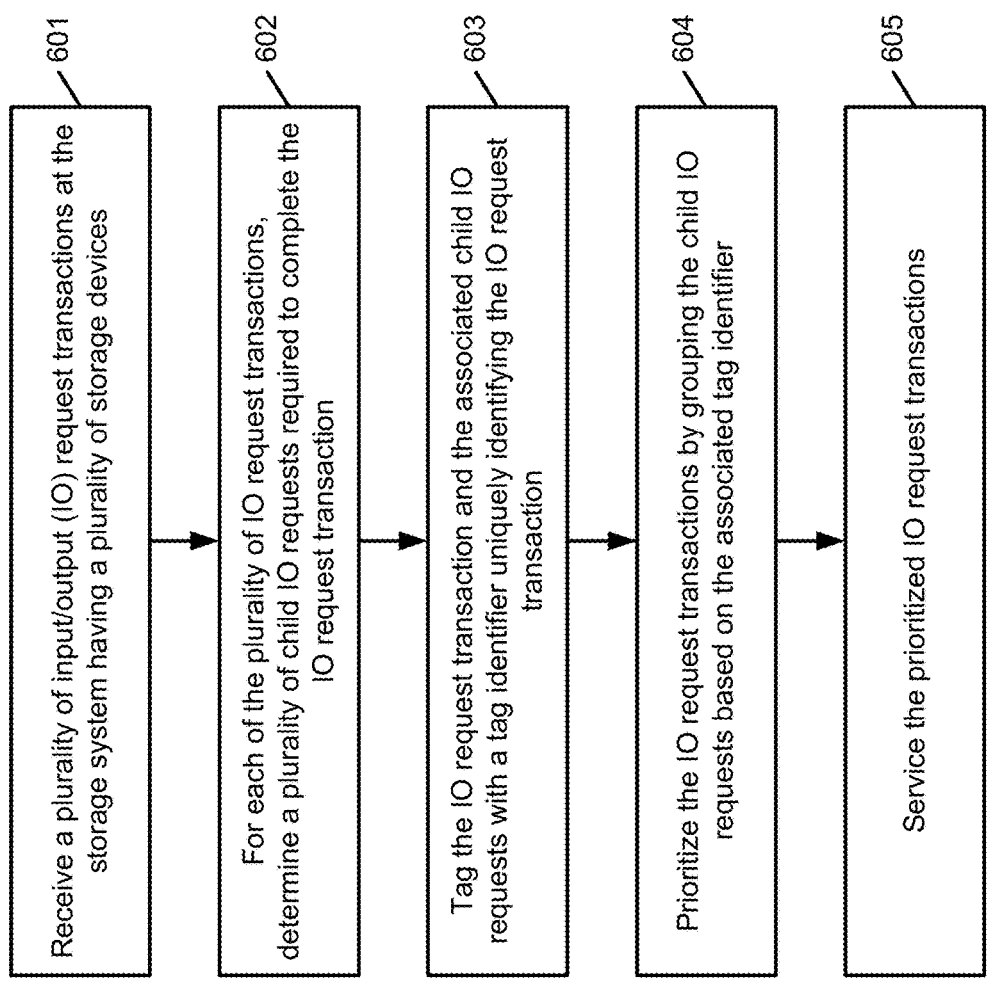
FIG. 6 is a block diagram illustrating a storage system with transactional IO prioritized according to one embodiment.

FIG. 6 is a flow diagram illustrating a process 600 for prioritizing input/output request transactions for a storage system according to one embodiment of the invention. Process 600 may be performed by processing logic that includes hardware (e.g. circuitry, dedicated logic, etc.), software (e.g., embodied on a non-transitory computer readable medium), or a combination thereof. For example, process 600 may be performed by storage system 104 of FIG. 2. Referring to FIG. 6, at block 601, processing logic receives a plurality of input/output (IO) request transactions at the storage system having a plurality of storage devices. At block 602, for each of the plurality of IO request transactions, processing logic determines a plurality of child IO requests required to complete the IO request transaction. At block 603, processing logic tags the IO request transaction and/or the associated child IO requests with a tag identifier uniquely identifying the IO request transaction. At block 604, processing logic prioritizes the IO request transactions by grouping the child IO requests based on the associated tag identifier. At block 605, processing logic services the prioritized IO request transactions.

In one embodiment, the child IO requests of an IO request transaction are dispatched based on at least an arrival time of the IO request transaction such that IO request transactions with an earlier arrival time are serviced prior to IO request transactions with a later arrival time. In one embodiment, processing logic dynamically determines, at a point in time, completeness for each of the IO request transactions by a counter representing a number of child IO requests required to complete the IO request transaction, such that the counter is decremented when an associated child IO request is complete. In another embodiment, the completeness of an IO request transaction is dynamically determined by updating a counter representing a number of associated child IO requests which are completed. In another embodiment, servicing the prioritized IO request transactions includes dispatching child IO requests of the IO request transaction based on an arrival time and completeness of the IO request transaction. In another embodiment, dispatching child IO requests includes identifying the child IO requests at an IO stack level of the plurality of storage devices based on a tag identifier associated with the child IO requests. In one embodiment, the child IO requests includes a first child IO request to read/write a metadata segment at a first storage device and a second child IO request to read/write a data segment at a second storage device, such that the first storage device is a different storage device than the second storage device.

Figure 7:
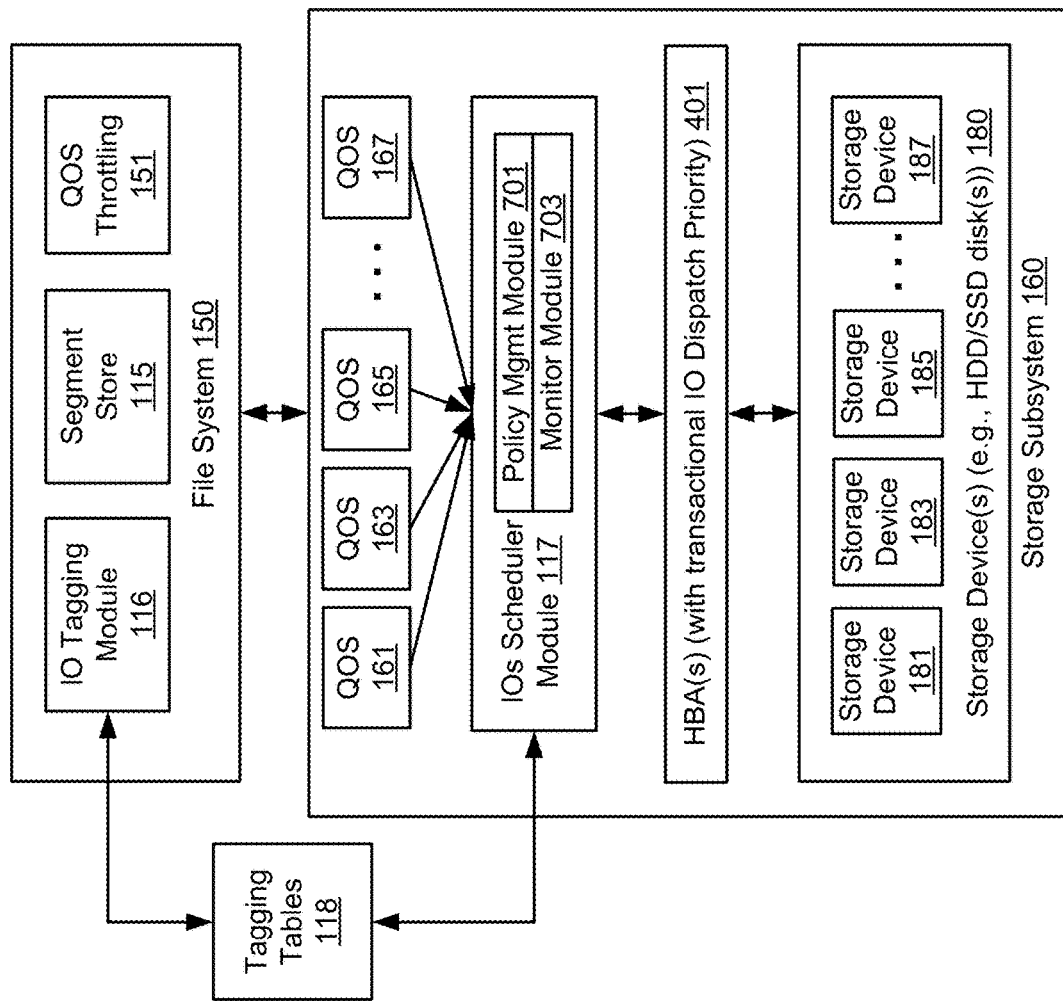
FIG. 7 is a flow diagram of a method according to one embodiment.

FIG. 7 is a block diagram illustrating a storage system for optimal read performance according to one embodiment. Referring to FIG. 7, storage system 700 may be storage system 400 of FIG. 4A. IOs scheduler module 117 includes policy management module 701 and monitor module 703. Policy management module 701 can manage dispatch policies, such as creating, updating, removing dispatch policies, either manually based on user defined settings or automatically based on some predetermined rules. Monitor module 703 monitors completeness of IO request transactions based on a ratio of child IOs completed to the total number of child IOs, as described supra. Monitor module 703 can also detect storage events and can determine or track how long it takes to complete an IO transaction request with respect to a particular storage device. Scheduler module 117 can optimize IO priority based on a policy, such as a policy to optimize virtual machine (VM) instant accesses to enable user to run instances of virtual machines directly on a backup storage system.

FIG. 8 is a table illustrating application IO types according to one embodiment. Table 800 may be part of tagging tables 118 of FIG. 7. Alternatively, service priority table 800 may be preconfigured via a configuration application programming interface (API), such as a command line interface (CLI) by an administrator. Table 800 may be maintained or accessible to IO schedule 117. Table 800 may be initially derived from QoS throttling 151 of FIG. 7. Table 800 includes three columns: application IO type 801, service priority 802, and maximum latency 803. Each entry maps an IO type to a service priority. Application IO type 801 includes different types of IO request transactions. For example, an IO request transaction can be an instance of a virtual machine workload, a backup operation, or an internal operation. Each type may be associated with a particular priority. Service priority 802 includes a priority level (e.g., high, medium, low) associated with an application IO type. Optional max latency 803 includes a maximum read latency (i.e., a threshold value) associated with an application IO type. Service priority 802 can be used to prioritize IO request transactions based on an IO type of the IO request transaction by a policy management module such as module 701 of FIG. 7 to support various IO policies. The max latency 803 can be used to put a limitation on pending IO request transactions or to estimate a time to complete a transaction. For example, management module 701 can dynamically set a dispatch policy by taking into consideration application IO type of currently pending IOs. An example policy may be to priority VM instant workload with a high priority, application backups with a medium priority and internal operations such as garbage collection with a low priority. Note determination of a type of IO for pending IOs may be provided by QoS throttling 151 of file system 150 of FIG. 7. Based on the policy, an IOs scheduler module such as module 117 of FIG. 7 schedules pending IOs accordingly. If it is determined that a pending IO request transaction will take more than a max time latency (e.g., as part of max latency 803) to complete the transaction, the scheduler can reprioritize the IO request transaction according to a different policy.

FIG. 9 is a table illustrating IO priority according to one embodiment. Table 900 includes a number of entries, each entry having the following fields: IO transaction 901, service priority 903, tag ID 905, arrival time 907, internal child IO 909, % transaction complete 911, and transaction dispatch order 913. Service priority 903 includes priority levels for corresponding IO transactions. Percentage transaction complete 911 can represent how many child IOs are completed versus the total number of associated child IOs. In another embodiment, percentage transaction complete can represent a predicted completeness and can be updated in real-time to anticipate or predict a completion time of the current IO transaction based on prior complete times of similar IO transactions, i.e., similar to a progress bar. Referring to table 900, in this example, an IOs scheduler module such as IOs scheduler module 117 of FIG. 7 can dispatch IOs based on factors in the order of: 1) arrival time, 2) service priority, and 3) completion percentage.

Referring to FIG. 9, for example, IO requests arriving at time 1000 include VM_Instant_IO_1, VM_Instant_IO_2, and Backup_App_IO_1. VM_Instant_IO_1 and VM_Instant_IO_2 have 98 percent and 97 percent completion, respectively, and have the same priority, thus, they can have a transaction dispatch order of "1" and "2" respectively. Backup_App_IO_1 with a lower priority has a dispatch order of "3." At arrival time 1001, backup_App_IO_1 has a dispatch order of "4." IO request transactions arriving at time 1004 include VM_Instant_IO_3 and VM_Instant_IO_4. VM_Instant_IO_4 completion percentage is 94, higher than a 71 of VM_Instant_IO_3, so VM_Instant_IO_4 has a dispatch order of "5" and VM_Instant_IO_3 has a dispatch order of "6." At arrival time 1008, backup_App_IO_3 has a dispatch order of "7." IO requests arriving at time 1009 include GC_IO_2 and GC_IO_3. According to their percentage completion, GC_IO_2 and GC_IO_3 have dispatch orders of "8" and "9" respectively. VM_instant_IO_5 and Backup_App_IO_4 have arrival times 1010 and 1011. Their dispatch orders are "10" and "11" respectively.

In another embodiment, scheduler module 117 may look at percentage completion of VM_instant_IO_3 (e.g., 71) and may predict that it will take more than 10 milliseconds to complete the request (greater than the max latency associated with an IO type of VM_Instant_IO referring to FIG. 8). At which point, module 117 may knock down the dispatch order by "1." Thus, VM_Instant_IO_3 and Backup_App_IO_3 can have dispatch orders of "7" and "6" respectively.

Figure 10:
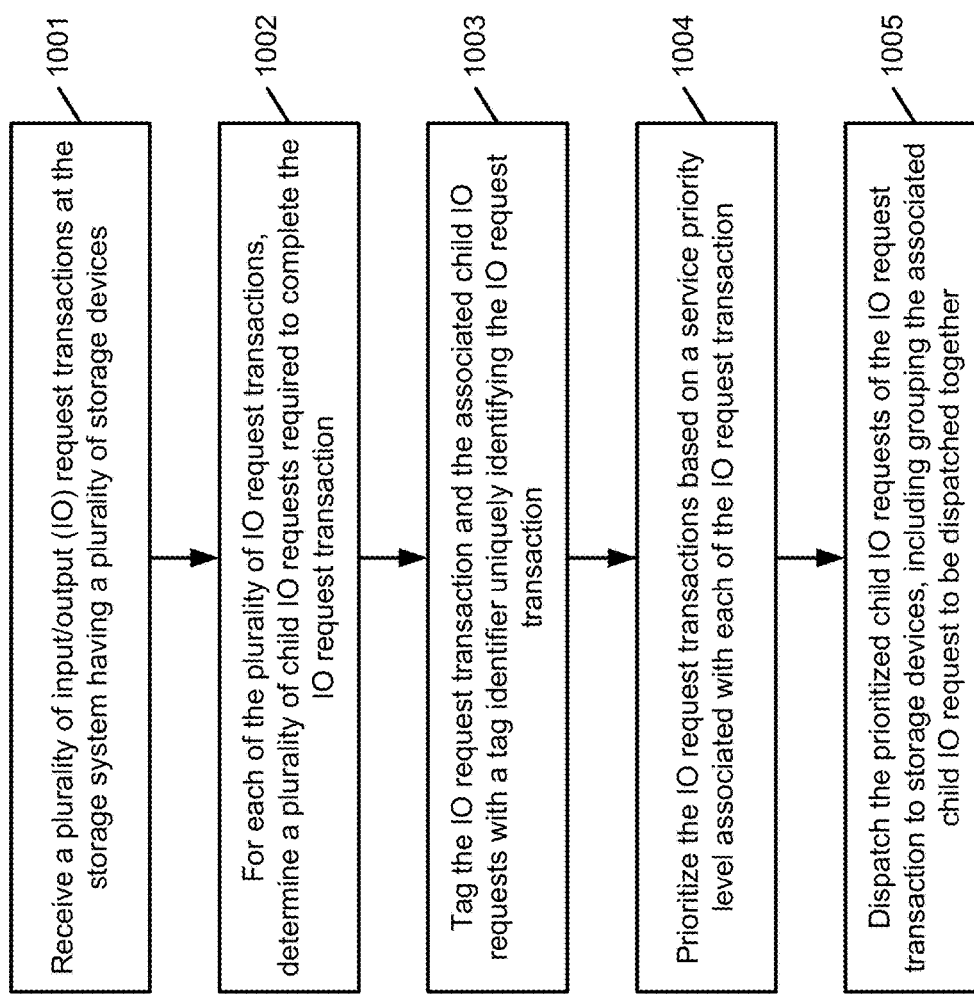
FIG. 10 is a flow diagram of a method according to one embodiment.

FIG. 10 is a flow diagram of a method for prioritizing input/output request transactions for a storage system according to one embodiment. Process 1000 may be performed by processing logic that includes hardware (e.g. circuitry, dedicated logic, etc.), software (e.g., embodied on a non-transitory computer readable medium), or a combination thereof. For example, process 1000 may be performed by storage system 104 of FIG. 2. Referring to FIG. 10, at block 1001, processing logic receives a plurality of input/output (IO) request transactions at the storage system having a plurality of storage devices. At block 1002, for each of the plurality of IO request transactions, processing logic determines a plurality of child IO requests required to complete the IO request transaction. At block 1003, processing logic tags the IO request transaction and/or the associated child IO requests with a tag identifier uniquely identifying the IO request transaction. At block 1004, processing logic prioritizes the IO request transactions based on a service priority level associated with each of the IO request transaction. At block 1005, processing logic dispatches the prioritized child IO requests of the IO request transaction to storage devices, including grouping the associated child IO request to be dispatched together.

In one embodiment, prioritizing the IO request transactions includes determining IO types of a first and a second IO request transactions of the plurality of IO request transactions. The IO types include: IO read access, IO write access, and system IO access. In another embodiment, prioritizing the IO request transactions includes determining a service priority level of the first and the second transactions based on the IO types. The priority levels include a HIGH, a MEDIUM, and a LOW service priority level. In another embodiment, prioritizing the IO request transactions includes prioritizing based on arrival times of IO request transactions.

In one embodiment, process logic determines completeness of the IO request transactions by a plurality of counters, such that each of the counters represents a number of child IO requests required to complete the respective IO request transaction, such that the counter is decremented when a child IO request is completed. In another embodiment, prioritizing the IO request transactions includes prioritizing based on completeness of the IO request transactions.

In one embodiment, processing logic associates a maximum latency with each of the IO types and overrides a dispatch order of an IO request transaction if an estimated time to completion of the IO request transaction is greater than the maximum latency of the IO type of the IO request transaction to avoid starving lower priority level IO request transactions. In another embodiment, overriding a dispatch order of an IO request transaction includes demoting a dispatch order associated with the IO request transaction to a previous dispatch order. In another embodiment, overriding a dispatch order of an IO request transaction includes demoting a service priority associated with the IO request transaction to a lowest service priority.

According to one scenario, an end-user may be running a user initiated incremental backup while at the same time running VM instances from a backup storage system. In this scenario, two additional functionalities are introduced so the user does not experience an IO performance bottleneck. The first functionality is to "dynamically" update service priority levels of an IO type service priority table such as table 1100 of FIG. 11.

FIG. 11 is a table illustrating application IO types according to one embodiment. Table 1100 may be part of tagging tables 118 of FIG. 7. Similar to table 800 of FIG. 8, table 1100 includes the application IO type 801, service priority 802, and maximum latency 803 columns. Table 1100 also includes child IO quota column 1101. The table is dynamically updated based on current user workload. For example, storage system monitors the user system and determines if the user is performing a manual incremental backup task, rather than automatic backup tasks, i.e., via monitor module 703 of FIG. 7. When a manual backup task is detected, Back_App_IO IO type in table 1100 is updated to be the highest in priority. Thus, subsequent IOs will be scheduled according to the updated service priority while prior pending IOs in the HBA buffer are serviced as scheduled.

Child IO quota column 1101 is implemented as a second functionality to include a weight or quota value for each IO types to allow a proportionate dispatch policy. Child IO quota values can be used in at least two implementations. In a first implementation, according to one embodiment, the child IO quota values may be used as a frequency counter (frequency counter is inverse proportional to the quota value) for dispatching IO requests based on IO types. For example, VM_Instant_Workload and Backup_App_IO, as shown in table 1100, can be marked with quota values of "1" and "10" respectively to allow 10 child IOs of the VM_Instant_Workload type to be serviced for every one child IO of the Backup_App_IO type to be serviced. This is useful when end-users are performing incremental backup workloads (e.g., Backup_App_IO) to backup or to write to the storage system (e.g., with an IO write size of 384 kB or 1 MB depending on a SSD buffer size), while running an instance of a backup (e.g., VM_Instant_Workload) (e.g., with an IO read size of 64 kB). To implement the functionality, while the IO buffer has mix read/write IO types, circular counters may be used to track how many IOs of IO types have been serviced. Each IO type can have a corresponding circular counter which increment by their quota value. When a counter of the IO type is at a maximum value, the system services a next IO type of the various IO types until all IO type counters reach a maximum value or the IO buffer no longer has a mix read/write IO types. The circular counters then reset. Thus, in the above example, the storage system can service 10 read IOs for every one write IO when there is a mixture of read/write IOs.

In a second implementation, according to another embodiment, the child IO quota values may be used as a delay mechanism to push back a dispatch order of an IO transaction. For example, when the storage system overrides an IO request transaction's service priority, e.g., demoting a service priority level associated with a request transaction to a lower dispatch order or demoting a service priority associated with the IO request transaction to a lowest service priority, when an estimated time to complete the IO request transaction is above a predetermined threshold value, the system services a number of child IO requests that is greater than or equal to the quota value of the IO types of the IO request transaction prior to resuming service for the IO request transaction. E.g., the IO is demoted to a lower dispatch order. Note quota values of "1" and "1" for VM_Instant_Workload and Backup_App_IO respectively can be default settings, in which case, write and read IOs are dispatched on an equal basis. In one embodiment, internal operations such as garbage collection can be updated to have the highest service priority level during scheduled or dedicated maintenance periods.

Figure 12:
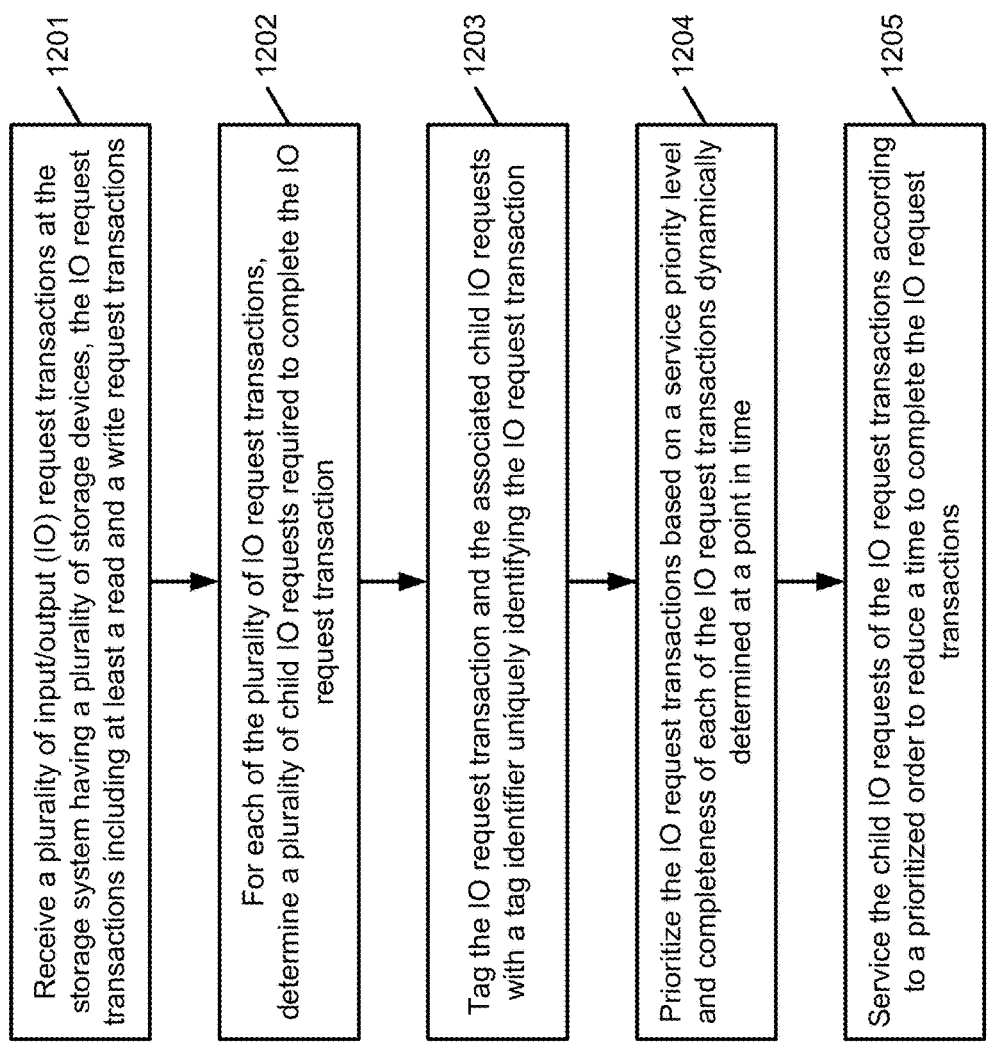
FIG. 12 is a flow diagram of a method according to one embodiment.

FIG. 12 is a flow diagram of a method for prioritizing mixed read/write IO request transactions for a storage system according to one embodiment. Process 1200 may be performed by processing logic that includes hardware (e.g. circuitry, dedicated logic, etc.), software (e.g., embodied on a non-transitory computer readable medium), or a combination thereof. For example, process 1200 may be performed by storage system 104 of FIG. 2. Referring to FIG. 12, at block 1201, processing logic receives a plurality of input/output (IO) request transactions at the storage system having a plurality of storage devices, the IO request transactions including at least a read and a write request transactions. At block 1202, for each of the plurality of IO request transactions, processing logic determines a plurality of child IO requests required to complete the IO request transaction, the child IO requests including at least a write child IO request and a read child IO request. At block 1202, processing logic tags the IO request transaction and/or the associated child IO requests with a tag identifier uniquely identifying the IO request transaction. At block 1203, processing logic prioritizes the IO request transactions based on a service priority level and completeness of each of the IO request transactions dynamically determined at a point in time. At block 1204, processing logic services the child IO requests of the IO request transactions according to a prioritized order to reduce a time to complete the IO request transactions.

In one embodiment, prioritizing the IO request transactions includes determining IO types of a first and a second IO request transactions of the plurality of IO request transactions, where IO types include IO read access, IO write access, and system IO access types. In another embodiment, prioritizing the IO request transactions includes determining a service priority level of the first and the second transactions based on the IO types and the priority levels include a HIGH, a MEDIUM, and a LOW service priority level. In another embodiment, process logic further determines completeness of the IO request transactions by a plurality of counters, such that each of the counters represents a number of child IO requests required to complete the respective IO request transaction and the counter is decremented when a child IO request is completed. In another embodiment, prioritizing the IO request transactions includes prioritizing based on completeness of the IO request transactions.

In another embodiment, processing logic associates a maximum latency with each of the IO types and overrides a service priority level of an IO request transaction if an estimated time to completion of the IO request transaction is greater than the maximum latency of the IO type of the IO request transaction to avoid starving lower priority level IO request transactions. In another embodiment, overriding a dispatch order of an IO request transaction includes demoting a service priority associated with the IO request transaction to a lowest service priority. In another embodiment, processing logic further associates a child IO quota value with each of the IO types, such that overriding a service priority level of an IO request transaction includes servicing a number of pending child IO requests greater than or equal to the quota value of the IO types of the IO request transaction prior to resuming service for the IO request transaction.

In one embodiment, processing logic associates a quota value with each of the IO types, such that frequency of dispatch of child IOs associated with the IO types are inversely proportional to the quota values. In one embodiment, for each of the plurality of IO request transactions, processing logic further tags the IO request transaction and/or the associated child IO requests with a second tag identifier identifying a service priority level associated with the IO request transaction.

Figure 13:
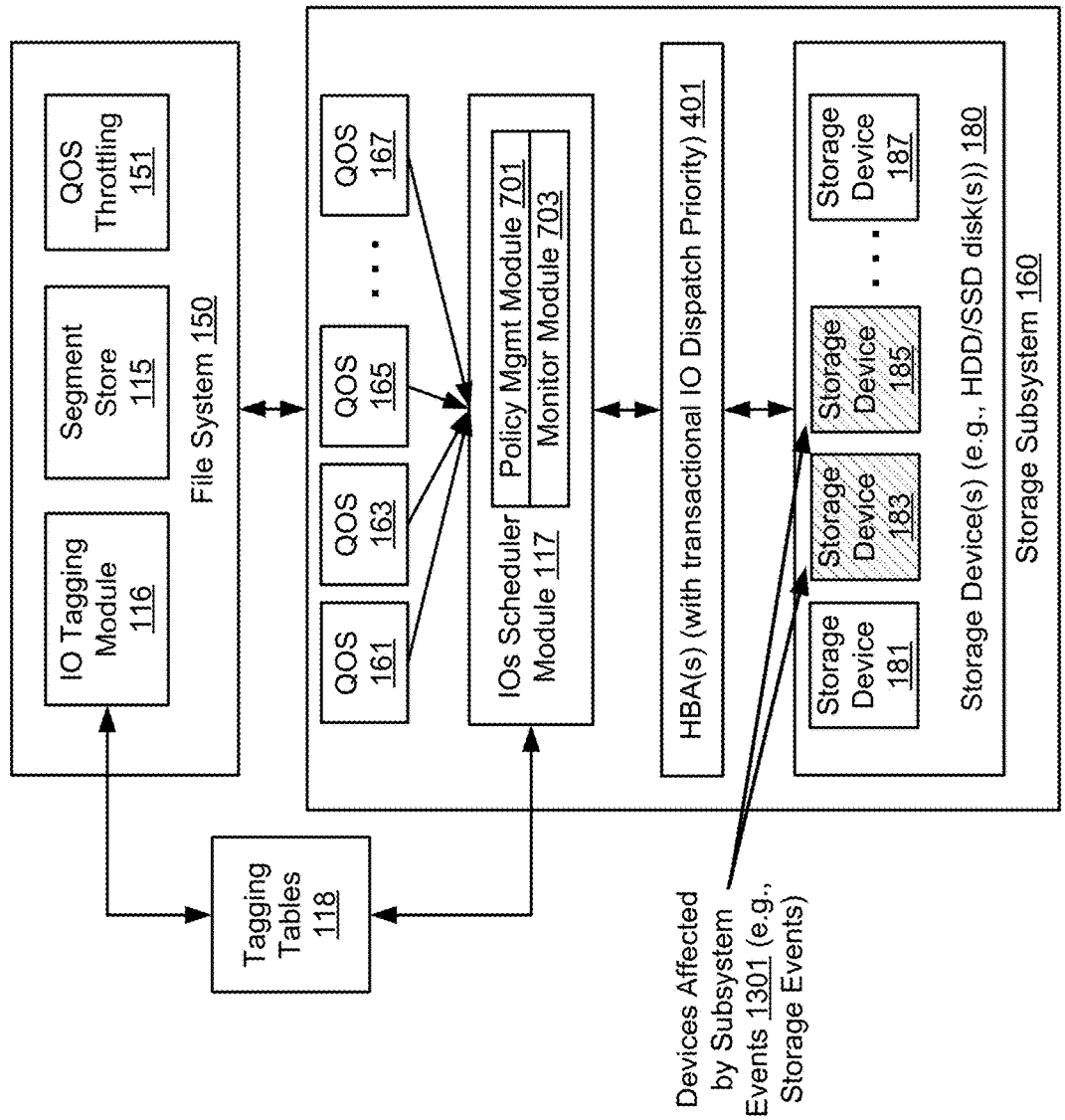
FIG. 13 is a block diagram illustrating a storage system having a busy storage device according to one embodiment.

FIG. 13 is a block diagram illustrating a storage system having storage devices with storage events according to one embodiment. Storage system 1300 optimizes read/write IOs to be resilient to storage subsystem performance according to one embodiment. Storage system 1300 may be storage system 700 of FIG. 7. Storage devices 183-185 highlighted in hash lines may not be running at optimal performances. Storage system 1300 receives data from monitor module 703 such as subsystem states (e.g., storage events 1301), such as, disk errors, disk path errors, SSD high write amplification of individual storage devices (e.g., HDD/SSD disks). By monitoring the storage subsystem, IOs scheduler module 117 can proactively predict transaction durations or a time to complete an IO transaction. Based on the prediction, transaction completeness can be adjusted and dynamically updated in real-time in view of the subsystem states. Policy management module 701 can further refine IO dispatch policies based on monitored subsystem states and IO transaction completion times.

FIG. 14 illustrates transactional IOs priority corresponding to a storage system of FIG. 13. Table 1400 includes a list of pending IO request transactions and its associated internal child IOs that are required to be completed to service the corresponding IO request transactions. By way of illustration, for example, Child IOs 1401-1404, in this example, may be serviced by storage 183-185 which are not running at optimal performance. While storage devices 181 and 187 are running free from performance issues. The storage system has knowledge about the storage devices through monitor module 703. Monitor module 703 can monitor storage devices in real-time via system and/or peripheral events for subsystem states (e.g., events 1301). The subsystem states can include, but not limited to, storage device error events, storage device path error events, and solid state storage device high write amplification events. Tagging module 116 tags the IO request transactions and its associated child IO requests with tag identifiers. In addition, tagging module 116 and IO scheduler module 117 may initialize and keep track by counter mechanisms to count how many of the child IOs are completed from a list of child IOs associated with each of the IO request transactions. For example, the counter mechanisms may be counters as part of a column of table 1400 (not shown). IO schedule module 117 can dynamically update a percentage completion column of table 144 based on counter values of the counter mechanisms.

IO scheduler module 117 can predict a completion time based on the monitoring information, and information from a tagging table as part of tagging tables 118 of FIG. 13, such as, arrival time, and information on percentage of completion of the associated IO request transaction. Based on the completion time, IO scheduler module 117 sends pending child IO requests to the HBA(s) in a first order based on the predicted completion times. In another embodiment, policy module 701 may dynamically update a dispatch policy based on the completion times, either permanently or temporary until the system/peripheral events or issues are alleviated (e.g., performance issues are cured).

For example, referring to row one of FIG. 14, Backup_App_IO_1 without any marked storage events may have time latencies for its child IOs as: IDX=30 ms; LP=20 ms; META=40 ms; and L0=10 ms. The time latency for Backup_App_IO_1 without storage events can be approximated by a maximum function applied to the child IO latencies, i.e., 40 ms. The completion time thus would be 40 ms after an arrival time of the IO request transaction. In another example, Backup_App_IO_1 with a marked storage event for META IO may have time latencies for its child IOs as: IDX=30 ms; LP=20 ms; META=~100 ms; and L0=10 ms. Here, 100 ms may be derived from a historical trend of average time latency typical of the storage event. Thus, a time to complete Backup_App_IO_1 with a storage event flag is approximately 100 ms after its arrival time. When a subsystem raises events 1301, such as storage events, monitor module 703 determines the affected storage devices, IO scheduler module 117 determines the prediction time to completion as described above, updates the dispatch ordering and send the child IO requests based on the updated ordering to the affect storage devices.

In another example, for simplicity of implementation, instead of predicting a completion time, IO scheduler module 117 may simply demote the dispatch ordering of affected child IOs (child IOs to be serviced by storage devices with storage events) by a fixed number of dispatch orders when monitor module 703 receives storage events affecting the child IOs. In another example, the dispatch order takes into account the service level priority of IO types of IO request transactions.

Referring to row one of FIG. 14, Backup_App_IO_1 request transaction may be serviced by child IOs: BKUP_IDX_IO_1, BKUP_LP_IO_1, BKUP_META_IO_1, and BKUP_L0_IO_1. The storage system may have determined that child IO BKUP_META_IO_1 is to be serviced by a flagged storage device, e.g., storage device 183, based on a storage device/metadata index database. Monitor module 703 detects storage events, such as storage events 1301, by polling or via callback. Monitor module 703 may keep a historical trend of minimum and/or average time latencies for various storage events. For each of the detected storage events (e.g., events 1301), storage system determines minimum and/or average historical time latencies associated with the detected events and determines which storage devices are affected by the events. Based on the affected storage devices and corresponding time latencies, storage system predicts as described above a time to complete the pending IO request transactions. IOs scheduler module 117 predicts a completion time for each incomplete child IO such as child IO BKUP_META_IO_1 (as part of IO request transaction Backup_App_IO_1) based on minimum/average historical time latencies corresponding to prior similar storage events. IOs scheduler module 117 predicts completion times for other pending IO request transactions. IOs scheduler module 117 reorders transaction dispatch ordering based on the predicted completion times of pending IO request transactions such that IO request transactions with earlier completion times will have higher priorities.

In one embodiment, predicted completion times of pending IO request transactions can be dynamically updated. If a predicted completion time of Backup_App_IO_1 is updated to be greater than predicted completion times of other pending IO request transactions, the assigned dispatch ordering of child IOs of Backup_App_IO_1 can be updated (i.e., demoted) to yield to child IOs of other IO request transactions having earlier predicted completion times. The affected child IOs can be demoted by a fixed dispatch ordering value, such as 10. In another embodiment, IO request transactions with child IOs marked to be serviced by a device with device events (i.e., indicating a reduced performance) can be demoted to yield to only IO request transactions with child IOs none of which are marked with device events. In another embodiment, storage system demotes a service priority level associated with IO request transactions having child IOs to be serviced by storage devices with storage events. In one embodiment, predicting a completion time for the IO request transaction includes predicting a completion time using a counter to represent a number of pending child IO requests required to complete the IO request transaction. The counter is decremented when a child IO request completes.

Referring to FIG. 14, according to an exemplary dispatch policy, predicted completion times may be calculated in an order of: 1) IO type, 2) storage events, 2) arrival time, and/or transaction completion percentage. Table 1400 includes two types of pending IOs to be dispatched by a dispatch policy, which are Backup Application IOs (to be serviced first) and GC or internal operation IOs (to be serviced second). Four child IOs to be serviced by storage devices affected by one or more storage events are as follows: BKUP_META_IO_1 (1401), BKUP_LP_IO_2 (1402), BKUP_LP_IO_A (1403), and GC_CLNT-1_IO_2 (1404). From only the IO types and storage events, the IO transactions {Backup_App_IO_1, Backup_App_IO_2, Backup_App_IO_3, Backup_App_IO_10, GC_IO_2, and GC_IO_3} would be dispatched in the orders of {2, 3, 1, 4, 6, 5}. Taking into consideration the arrival time and/or completion percentage. The IOs' transaction dispatch order would be updated to {3, 2, 1, 4, 6, 5}.

Figure 15:
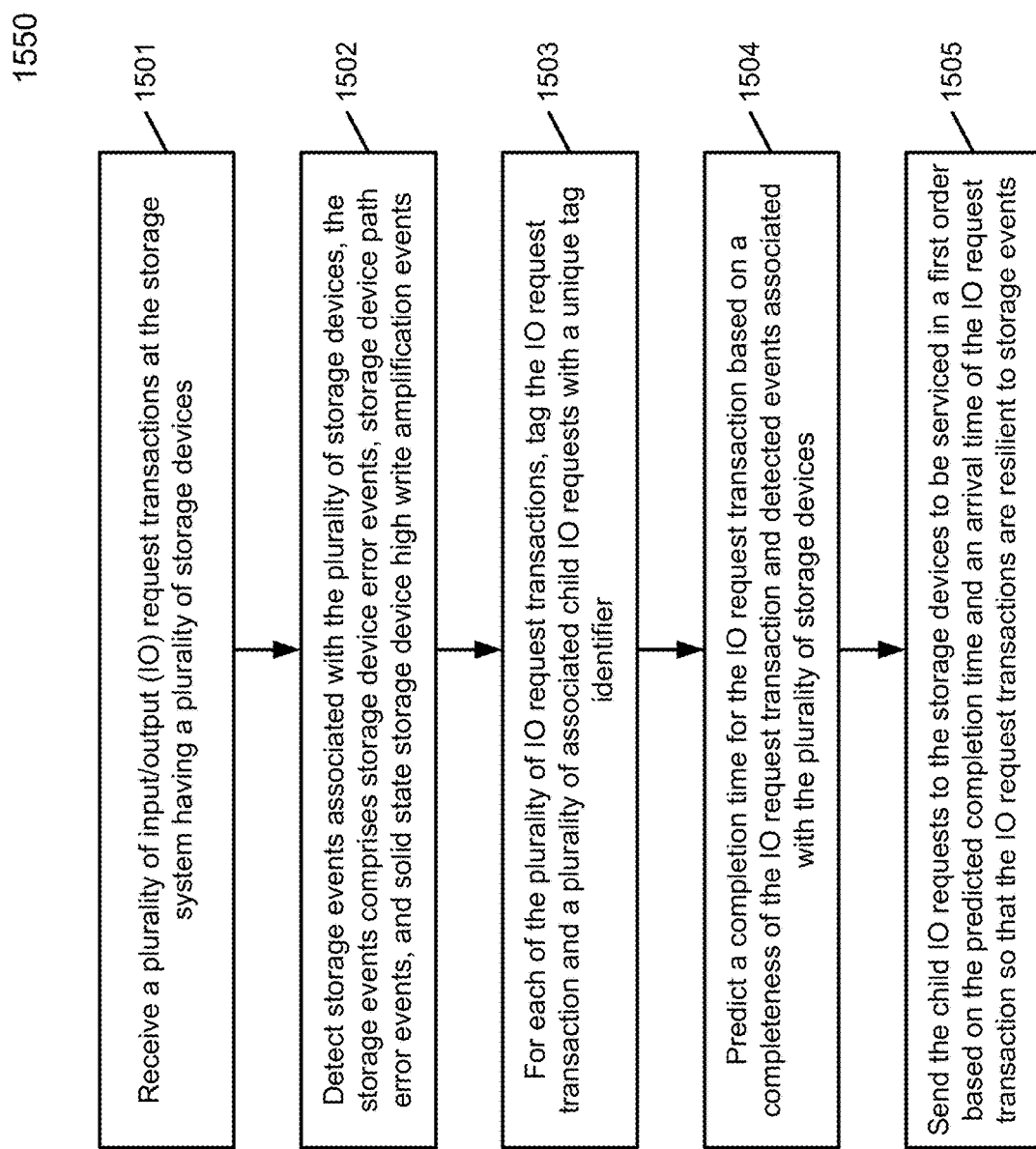
FIG. 15 is a flow diagram of a method according to one embodiment.

FIG. 15 is a flow diagram of a method for prioritizing input/output request transactions to be resilient to storage events for a storage system according to one embodiment. Process 1550 may be performed by processing logic that includes hardware (e.g. circuitry, dedicated logic, etc.), software (e.g., embodied on a non-transitory computer readable medium), or a combination thereof. For example, process 1500 may be performed by storage system 104 of FIG. 2. Referring to FIG. 15, at block 1501, processing logic receives a plurality of input/output (IO) request transactions at the storage system having a plurality of storage devices. At block 1502, processing logic detects storage events associated with the plurality of storage devices, the storage events including storage device error events, storage device path error events, and solid state storage device high write amplification events. At block 1503, for each of the plurality of IO request transactions, processing logic tags the IO request transaction and/or a plurality of associated child IO requests with a tag identifier. At block 1504, processing logic predicts a completion time for the IO request transaction based on a completeness of the IO request transaction and detected events associated with the plurality of storage devices. At block 1505, processing logic sends the child IO requests to the storage devices to be serviced in a first order based on the predicted completion time and an arrival time of the IO request transaction so that the IO request transactions are resilient to storage events.

In one embodiment, predicting a completion time for the IO request transaction includes determining a plurality of minimum times required to complete the associated child IO requests, respectively, and applying a maximum function to the minimum times to predict the completion time of the IO request transaction. In another embodiment, for each of the detected storage events, processing logic determines an average time latency previously associated with the storage event and determines affected storage devices. Processing logic updates the prediction time to completion of the IO request transaction having access to the affected storage devices and sends the child IO requests to the affected storage device in a second order based on the updated prediction time to complete the IO request transaction. In another embodiment, for each of the detected storage events, processing logic determines a minimum time latency previously associated with the storage event and updates the prediction time to completion based on the minimum time latency.

In another embodiment, predicting a completion time for the IO request transaction includes predicting a completion time using a counter to represent a number of child IO requests required to complete the IO request transaction, such that the counter is decremented when a child IO request is completed. In another embodiment, processing logic further demotes an order of one or more child IOs to be serviced by storage devices marked with storage events by a fixed number. In another embodiment, processing logic further sends the child IO requests to the storage devices to be serviced in a first order based on a service level priority of IO types of the received IO request transactions. In one embodiment, the plurality of child IO requests include a first child IO request to read/write a metadata segment at a first storage device and a second child IO request to read/write a data segment at a second storage device and the first storage device is a different storage device than the second storage device.

According to another aspect, a storage system such as storage system 700 of FIG. 7 may have unproportioned dispatches for reads and writes when storage devices 180 include solid state drives (SSD) or flash disks. Flash disks based on the current technology tend to take longer to complete a write operation (e.g., about 3 ms-5 ms) in comparison to a read option (about 100 µs). This characteristic limits read operations to a flash disk when the storage system dispatches IOs based on a first in first out algorithm. i.e., when storage system does not differentiate between read and write operations. This limitation can be substantial. For example, given a stream of IOs to be dispatched in the order as follows: R5; R4; R3; R2; W5; W4; W3; W2; W1; R1. Assuming a flash drive has a write time latency equal of 5 ms, while read time latency is 100 µs. R1 would be processed after five writes. In other words, R1 incurs a 5*5=25 ms time latency.

A work around is to divide or segment write IOs into smaller chunks to allow read IOs to be interleaved between the write IOs chunks for dispatches to SSD/flash drives. A division of write IOs into chunks requires, first, a determination of an appropriate write IO chunk size. Optimal chunk write IO size can be different for different flash devices and manufacturers. In one embodiment, an optimal write IO chunk size can be determined by sending mixed read/write IOs to storage system and then monitoring actual IO traces (through an analyzer which displays packets on an IO bus to show IO dispatch sequences) to manually tweak a write IO chunk size until read IOs and write IO chunks are interleaved to a degree of satisfaction. In another embodiment, the write IO chunk size can be dynamically computed during run time. This dynamic computation is performed by automatically selecting a write IO chunk size from an array of write IO chunk sizes (e.g., 8 kB, 16 kB, 32 kB, 64 kB, and 128 kB) via a scheduler module (such as IO scheduler module 117) until the system returns optimal read/write IO performance readings. The storage system IO performances may be detected or read back by any suitable IO performance testing tools/software.

FIG. 16 is a table illustrating mixed read/write IOs transactions according to one embodiment. Table 1600 includes a list of pending IO request transactions and its corresponding internal child IOs that are required to be completed to service the IO request transactions. Child IOs 1601-1604, in this example, are read IOs to SSDs, while child IOs 1605-1608 are write IOs to SSDs. For the purpose of illustration, assuming all of these IOs are to be serviced by a single storage device, e.g., a single SSD. To service BKUP_LP_IO_1, BKUP_LP_IO_1 can be segmented into write IO chunks to interleave read IOs in between these write IO chunks.

Figure 17:
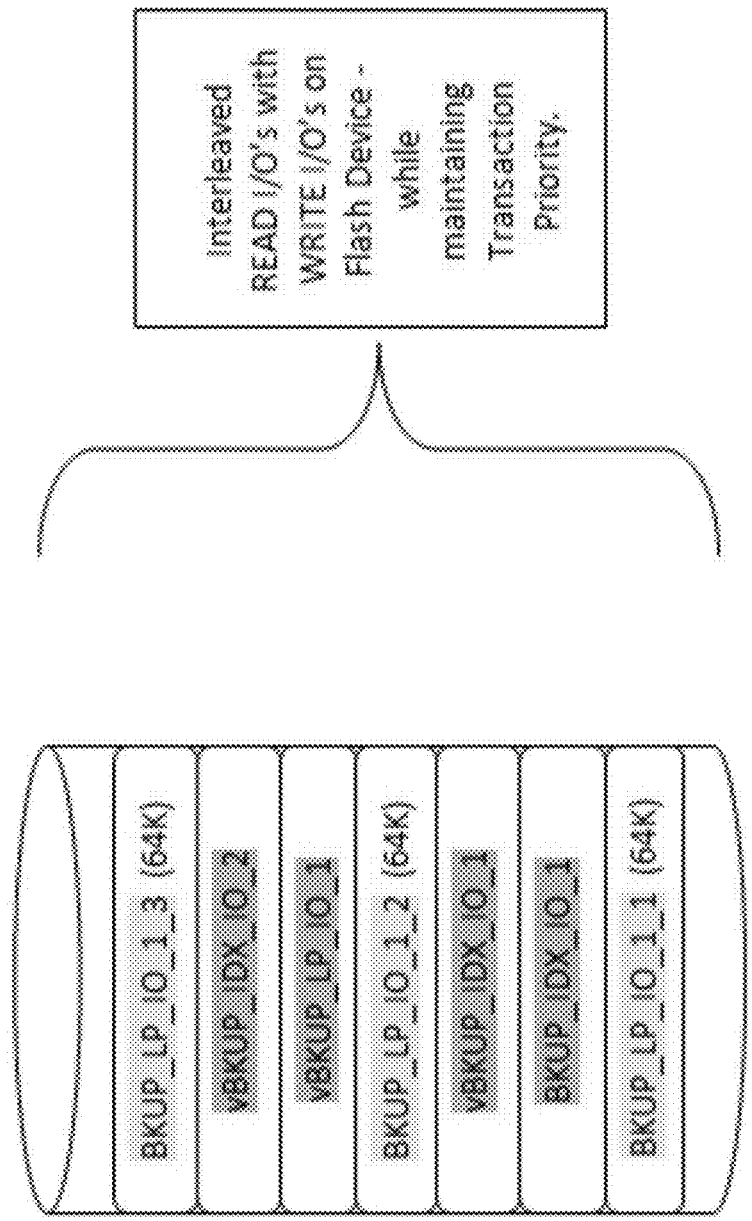
FIG. 17 is a table illustrating write IO chunks according to one embodiment.

FIG. 17 is a table illustrating a write IO segmented into chunks according to one embodiment. Table 1700 illustrates a write IO, e.g., BKUP_LP_IO_1, divided into multiple chunks, e.g., BKUP_LP_IO_1_1, BKUP_LP_IO_1_2, and BKUP_LP_IO_1_3, with a chunk size of 64 kB. These chunks are dispatched along with one or more read IOs (e.g., BKUP_IDX_IO_1, vBKUP_IDX_IO_1, vBKUP_LP_IO_1, and vBKUP_IDX_IO_2) interleaved in between. Here, two read IOs are interleaved in between consecutive write IO chunks such that HBA services IOs in the order of: BKUP_LP_IO_1_1, BKUP_IDX_IO_1, vBKUP_IDX_IO_1, BKUP_LP_IO_1_2, vBKUP_LP_IO_1, vBKUP_IDX_IO_2, and BKUP_LP_IO_1_3.

Figure 18:
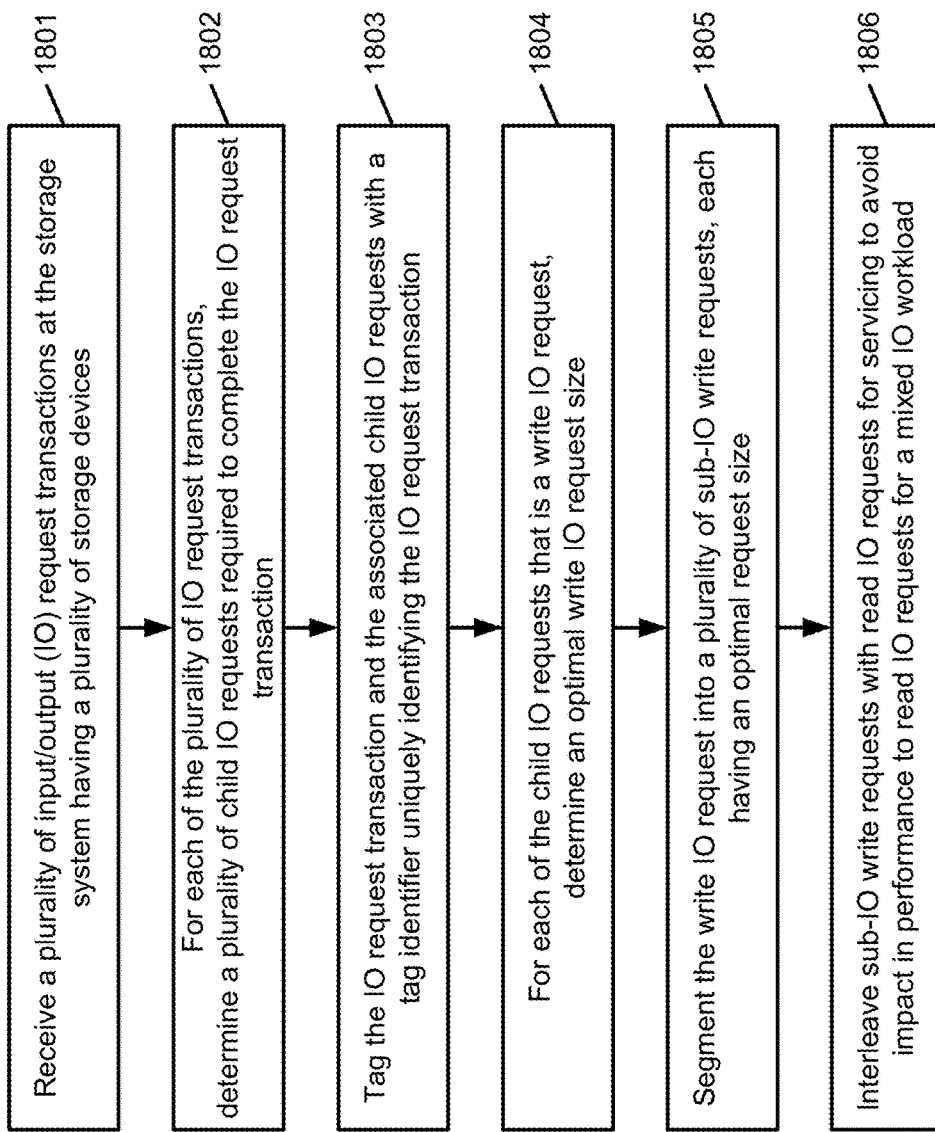
FIG. 18 is a flow diagram of a method according to one embodiment.

FIG. 18 is a flow diagram of a method according to one embodiment. Process 1800 may be performed by processing logic that includes hardware (e.g. circuitry, dedicated logic, etc.), software (e.g., embodied on a non-transitory computer readable medium), or a combination thereof. For example, process 1800 may be performed by storage system 104 of FIG. 2. Referring to FIG. 18, at block 1801, processing logic receives a plurality of input/output (IO) request transactions at the storage system having a plurality of storage devices. At block 1802, for each of the plurality of IO request transactions, processing logic determines a plurality of child IO requests required to complete the IO request transaction detect. At block 1803, processing logic tags the IO request transaction and/or the associated child IO requests with a tag identifier. At block 1804, for each of the child IO requests that is a write IO request, processing logic determines an optimal write IO request size. At block 1805, processing logic segments the write IO request into a plurality of sub-IO write requests, each having an optimal request size. At block 1806, processing logic interleaves sub-IO write requests with read IO requests for servicing to avoid impact in performance to read IO requests for a mixed IO workload.

In one embodiment, determining an optimal write IO request size includes analyzing IO sequences on an IO bus having mixed read and write IO requests at a fixed point in time to determine an optimal write IO request size for that fixed point in time so that the optimal write IO request size can be applied to future write IO requests. In one embodiment, determining an optimal write IO request size includes dynamically computing an optimal sub-IO write request size during run time to achieve optimal read IO request latency for a mixed IO workload. In one embodiment, determining an optimal write IO request size includes automatically selecting an optimal write IO request size are from a predetermined list of write IO request sizes based on a previous read IO request size.

In one embodiment, interleaving sub-IO write requests with read IO requests includes interleaving sub-IO write requests with read IO requests while maintaining a priority of IO request transactions. In another embodiment, transaction priority is maintained by servicing sub-IO write requests and pending read IO requests based on an arrival time and a completion rate of the respective IO requests. In one embodiment, sub-IO write requests are interleaved by grouping sub-IO write requests with child read IO requests of the associated IO request transaction or child read IO requests of other read IO request transactions to be serviced.

Note that some or all of the tables as shown and described above such as table 500 of FIG. 5 can be implemented as a database table, linked list, array, container, or any storage-type objects such as a plain text file. Note that some or all of the components as shown and described above (e.g., IO tagging module 116, tagging tables 118, and IOS scheduler module 117 of FIG. 4A) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 19:
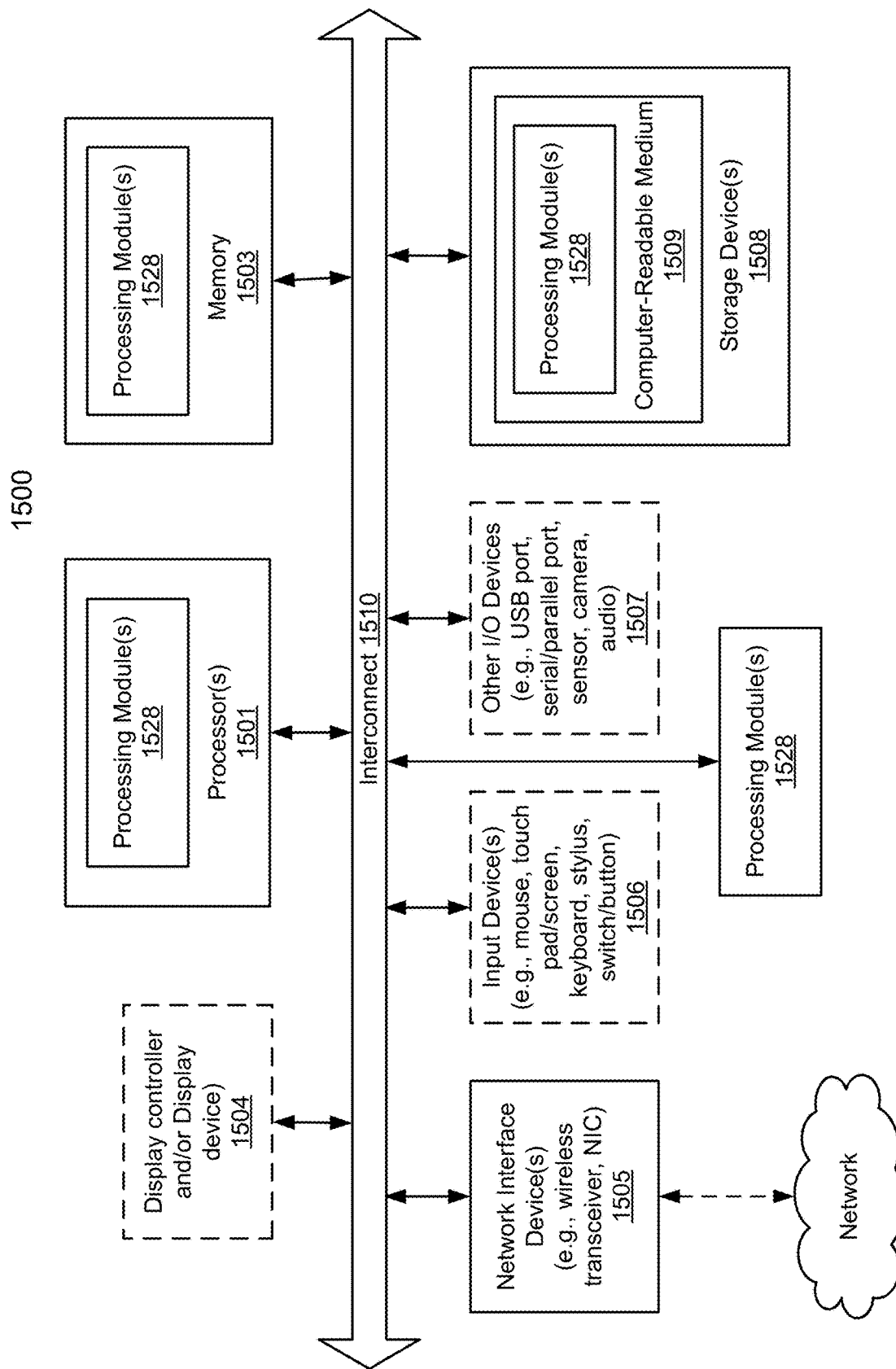
FIG. 19 is a block diagram illustrating a data processing system according to one embodiment.

FIG. 19 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, an IO tagging module, or an IOs scheduler module, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A storage system comprising:
a processor;
a memory coupled to the processor to store instructions for execution;
an input/output (IO) tagging module executed by the processor to determine a plurality of child IO requests required to complete each of a plurality of received IO request transactions and to tag the associated child IO requests with a tag identifier uniquely identifying the IO request transaction so the child IO requests associated with each of the plurality of IO request transactions are identified and grouped by the tag identifier unique to each of the plurality of IO request transactions;
an IO scheduler module executed by the processor to prioritize an order of dispatching the plurality of IO request transactions, based at least on a service priority level associated with each of the IO request transaction and completeness of each of the IO request transactions, by grouping and prioritizing the child IO requests as a group based on the associated tag identifier; and
a plurality of storage devices to service the prioritized plurality of IO request transactions;
wherein the child IO requests of the IO request transactions are sent to the plurality of storage devices to be serviced based at least on the order of dispatching of the plurality of IO request transactions prioritized by the IO scheduler module.

2. The system of claim 1, wherein the child IO requests of an IO request transaction are dispatched based on at least an arrival time of the IO request transaction such that IO request transactions with an earlier arrival time are serviced prior to IO request transactions with a later arrival time.

3. The system of claim 1, wherein the IO scheduler module is to dynamically determining, at a point in time, completeness for each of the IO request transactions by a counter representing a number of child IO requests required to complete the IO request transaction, wherein the counter is decremented when an associated child IO request is complete.

4. The system of claim 3, wherein completeness of an IO request transaction is dynamically determined by updating the counter representing a number of associated child IO requests which are completed.

5. The system of claim 4, wherein the plurality of storage devices service the prioritized IO request transactions by dispatching child IO requests of the IO request transaction based on an arrival time and completeness of the IO request transaction.

6. The system of claim 5, wherein dispatching child IO requests comprises identifying the child IO requests at an IO stack level of the plurality of storage devices based on the tag identifier associated with the child IO requests.

7. The system of claim 1, wherein the child IO requests comprise:
a first child IO request to read/write a metadata segment at a first storage device; and
a second child IO request to read/write a data segment at a second storage device, wherein the first storage device is a different storage device than the second storage device.

8. A non-transitory machine-readable medium storing instructions which, when executed by one or more processors, cause the one or more processors to perform operations comprising:
receiving a plurality of input/output (IO) request transactions at the storage system having a plurality of storage devices;
for each of the plurality of IO request transactions,
determining a plurality of child IO requests required to complete the IO request transaction;
tagging the associated child IO requests with a tag identifier uniquely identifying the IO request transaction so the child IO requests associated with the IO request transaction are identified and grouped by the tag identifier unique to the IO request transaction;
prioritizing an order of dispatching the plurality of IO request transactions, based at least on a service priority level associated with each of the IO request transaction and completeness of each of the IO request transactions, by grouping and prioritizing the child IO requests as a group based on the associated tag identifier; and
servicing the prioritized plurality of IO request transactions;
wherein the child IO requests of the IO request transactions are sent to the plurality of storage devices to be serviced based at least on the order of dispatching of the plurality of IO request transactions.

9. The medium of claim 8, wherein the child IO requests of an IO request transaction are dispatched based on at least an arrival time of the IO request transaction such that IO request transactions with an earlier arrival time are serviced prior to IO request transactions with a later arrival time.

10. The medium of claim 8, further comprising dynamically determining, at a point in time, completeness for each of the IO request transactions by a counter representing a number of child IO requests required to complete the IO request transaction, wherein the counter is decremented when an associated child IO request is complete.

11. The medium of claim 10, wherein completeness of an IO request transaction is dynamically determined by updating the counter representing a number of associated child IO requests which are completed.

12. The medium of claim 11, wherein servicing the prioritized IO request transactions comprises dispatching child IO requests of the IO request transaction based on an arrival time and completeness of the IO request transaction.

13. The medium of claim 12, wherein dispatching child IO requests comprises identifying the child IO requests at an IO stack level of the plurality of storage devices based on the tag identifier associated with the child IO requests.

14. The medium of claim 8, wherein the child IO requests comprise:
a first child IO request to read/write a metadata segment at a first storage device; and
a second child IO request to read/write a data segment at a second storage device, wherein the first storage device is a different storage device than the second storage device.

15. A computer-implemented method to prioritize input/output (IO) request transactions for a storage system, the method comprising:
receiving a plurality of IO request transactions at the storage system having a plurality of storage devices;
for each of the plurality of IO request transactions,
determining a plurality of child IO requests required to complete the IO request transaction;
tagging the associated child IO requests with a tag identifier uniquely identifying the IO request transaction so the child IO requests associated with the IO request transaction are identified and grouped by the tag identifier unique to the IO request transaction;
prioritizing an order of dispatching the plurality of IO request transactions, based at least on a service priority level associated with each of the IO request transaction and completeness of each of the IO request transactions, by grouping and prioritizing the child IO requests as a group based on the associated tag identifier; and
servicing the prioritized plurality of IO request transactions;
wherein the child IO requests of the IO request transactions are sent to the plurality of storage devices to be serviced based at least on the order of dispatching of the plurality of IO request transactions.

16. The medium of claim 15, wherein the child IO requests of an IO request transaction are dispatched based on at least an arrival time of the IO request transaction such that IO request transactions with an earlier arrival time are serviced prior to IO request transactions with a later arrival time.

17. The computer-implemented method of claim 15, further comprising dynamically determining, at a point in time, completeness for each of the IO request transactions by a counter representing a number of child IO requests required to complete the IO request transaction, wherein the counter is decremented when an associated child IO request is complete.

18. The computer-implemented method of claim 17, wherein completeness of an IO request transaction is dynamically determined by updating the counter representing a number of associated child IO requests which are completed.

19. The computer-implemented method of claim 18, wherein servicing the prioritized IO request transactions comprises dispatching child IO requests of the IO request transaction based on an arrival time and completeness of the IO request transaction.

20. The computer-implemented method of claim 19, wherein dispatching child IO requests comprises identifying the child IO requests at an IO stack level of the plurality of storage devices based on the tag identifier associated with the child IO requests.

21. The computer-implemented method of claim 15, wherein the child IO requests comprise:
   a first child IO request to read/write a metadata segment at a first storage device; and
   a second child IO request to read/write a data segment at a second storage device, wherein the first storage device is a different storage device than the second storage device.

\* \* \* \* \*